(12) United States Patent
McCrommon et al.

(10) Patent No.: US 12,469,040 B1
(45) Date of Patent: Nov. 11, 2025

(54) METHOD, APPARATUS, AND COMPUTER PROGRAM PRODUCT FOR PROVIDING REAL-TIME PRICING INFORMATION

(71) Applicant: McKesson Corporation, Irving, TX (US)

(72) Inventors: Stacy McCrommon, Loganville, GA (US); Scott Genone, Roswell, GA (US); Mark Beers, Lilburn, GA (US); Keith Crozier, North Kingstown, RI (US)

(73) Assignee: McKesson Corporation, Irving, TX (US)

( * ) Notice: Subject to any disclaimer, the term of this patent is extended or adjusted under 35 U.S.C. 154(b) by 144 days.

(21) Appl. No.: 18/138,414

(22) Filed: Apr. 24, 2023

Related U.S. Application Data

(63) Continuation-in-part of application No. 17/499,976, filed on Oct. 13, 2021, and a continuation-in-part of application No. 16/832,318, filed on Mar. 27, 2020, now Pat. No. 11,636,548, and a continuation-in-part of application No. 16/698,752, filed on Nov. 27, (Continued)

(51) Int. Cl.
    *G06Q 30/0201* (2023.01)
    *G06Q 40/08* (2012.01)

(52) U.S. Cl.
    CPC ......... *G06Q 30/0206* (2013.01); *G06Q 40/08* (2013.01)

(58) Field of Classification Search
    CPC . G06Q 30/0239; G06Q 30/0283; G06Q 40/08
    See application file for complete search history.

(56) References Cited

U.S. PATENT DOCUMENTS

| 5,012,035 A | 4/1991 | Sartori et al. |
| 5,173,851 A | 12/1992 | Off et al. |
| (Continued) | | |

FOREIGN PATENT DOCUMENTS

| AU | 2003243327 A | 12/2003 |
| CA | 2 482 370 A1 | 3/2006 |
| (Continued) | | |

OTHER PUBLICATIONS

United States Patent and Trademark Office, Final Office Action received for U.S. Appl. No. 16/816,460, dated Aug. 10, 2023, 14 pages, U.S.

(Continued)

*Primary Examiner* — Calvin L Hewitt, II
*Assistant Examiner* — Amanulla Abdullaev
(74) *Attorney, Agent, or Firm* — Alston & Bird LLP

(57) ABSTRACT

A method, apparatus and computer program product are provided for providing real-time or near real-time pricing information with improved efficiency. A special price may be returned in response to a prescription inquiry, and/or an alternative price obtained from stored prescription transactions. The prescription inquiry may be transmitted to a claims processor computer and/or cash discount system in certain scenarios. If a response is not received within a time threshold, an estimated cost range may be determined. The real-time or near real-time pricing information is provided to a prescriber computer and may improve the efficiency of related systems, as well as prescription adherence by patients.

12 Claims, 4 Drawing Sheets

Related U.S. Application Data

2019, now abandoned, said application No. 17/499,976 is a continuation-in-part of application No. 16/453,509, filed on Jun. 26, 2019, now Pat. No. 11,562,437, said application No. 16/832,318 is a continuation-in-part of application No. 16/453,509, filed on Jun. 26, 2019, now Pat. No. 11,562,437.

(56) References Cited

U.S. PATENT DOCUMENTS

| | | |
|---|---|---|
| 5,595,342 A | 1/1997 | McNair et al. |
| 5,628,530 A | 5/1997 | Thornton |
| 5,726,092 A | 3/1998 | Mathews et al. |
| 5,757,898 A | 5/1998 | Nishikawa |
| 5,769,228 A | 6/1998 | Wroblewski |
| 6,012,035 A | 1/2000 | Freeman et al. |
| 6,111,218 A | 8/2000 | Akers et al. |
| 6,463,462 B1 | 10/2002 | Smith et al. |
| 6,595,342 B1 | 7/2003 | Maritzen et al. |
| 6,726,092 B2 | 4/2004 | Goldberg et al. |
| 6,757,898 B1 | 6/2004 | Ilsen et al. |
| 6,769,228 B1 | 8/2004 | Mahar |
| 7,155,397 B2 | 12/2006 | Alexander et al. |
| 7,192,741 B2 | 3/2007 | Otte et al. |
| 7,337,129 B1 | 2/2008 | Lowry et al. |
| 7,346,768 B2 | 3/2008 | DiRienzo |
| 7,409,632 B1 | 8/2008 | DiRienzo |
| 7,426,476 B2 | 9/2008 | Munoz et al. |
| 7,734,483 B1 | 6/2010 | Smith et al. |
| 7,783,383 B2 | 8/2010 | Eliuk et al. |
| 7,840,424 B2 | 11/2010 | Wiley et al. |
| 7,856,364 B1 | 12/2010 | Wiley et al. |
| 7,912,741 B1 | 3/2011 | Pinsonneault |
| 7,921,021 B1 | 4/2011 | Newman |
| 8,036,913 B1 | 10/2011 | Pinsonneault et al. |
| 8,036,914 B1 | 10/2011 | Pinsonneault |
| 8,036,918 B1 | 10/2011 | Pinsonneault |
| 8,050,943 B1 | 11/2011 | Wiley et al. |
| 8,060,379 B1 | 11/2011 | Pinsonneault et al. |
| 8,126,743 B1 | 2/2012 | Wilk |
| 8,326,773 B1 | 12/2012 | Bellamy |
| 8,346,571 B2 * | 1/2013 | Kalies, Jr. .............. G06Q 30/08 705/2 |
| 8,412,537 B1 | 4/2013 | Fenton et al. |
| 8,442,847 B1 | 5/2013 | Shrivastava |
| 8,489,415 B1 | 7/2013 | Ringold |
| 8,521,557 B1 | 8/2013 | Ringold et al. |
| 8,560,340 B1 | 10/2013 | Ringold |
| 8,639,523 B1 | 1/2014 | Pinsonneault |
| 8,645,162 B2 | 2/2014 | Boerger et al. |
| 8,671,018 B2 | 3/2014 | Thomas et al. |
| 8,712,797 B1 | 4/2014 | Bezdek et al. |
| 8,738,399 B1 | 5/2014 | Abou Nader et al. |
| 8,786,650 B1 | 7/2014 | Eller et al. |
| 8,799,018 B1 | 8/2014 | Rea et al. |
| 8,984,059 B1 | 3/2015 | Johnson |
| 9,026,507 B2 | 5/2015 | Shraim et al. |
| 9,100,793 B2 | 8/2015 | Johnson |
| 9,171,322 B2 | 10/2015 | Spievak et al. |
| 9,356,947 B2 | 5/2016 | Shraim et al. |
| 9,760,871 B1 | 9/2017 | Pourfallah et al. |
| 9,779,129 B1 | 10/2017 | Lequeux |
| 9,786,023 B2 | 10/2017 | Cohan et al. |
| 10,109,027 B1 | 10/2018 | Stack |
| 10,157,262 B1 | 12/2018 | Pinsonneault |
| 10,331,855 B1 | 6/2019 | Bratton et al. |
| 10,417,380 B1 | 9/2019 | Kaye et al. |
| 10,489,552 B2 | 11/2019 | Pinsonneault |
| 10,496,793 B1 | 12/2019 | Lawrence et al. |
| 10,565,656 B1 | 2/2020 | Pinsonneault et al. |
| 10,606,984 B1 | 3/2020 | Kaye et al. |
| 10,616,146 B1 | 4/2020 | Hopkins et al. |
| 10,628,797 B2 | 4/2020 | Shraim et al. |
| 10,642,812 B1 | 5/2020 | Hopkins et al. |
| 10,713,694 B1 | 7/2020 | Harris et al. |
| 10,747,848 B2 | 8/2020 | Guinan |
| 10,778,618 B2 | 9/2020 | Karnin et al. |
| 10,862,832 B1 | 12/2020 | Harris |
| 10,924,545 B2 | 2/2021 | Momchilov et al. |
| 10,924,585 B1 | 2/2021 | Harris et al. |
| 10,929,932 B1 | 2/2021 | Golden et al. |
| 10,978,198 B1 | 4/2021 | Pinsonneault |
| 10,999,224 B1 | 5/2021 | Frechen et al. |
| 11,043,293 B1 | 6/2021 | Salzbrenner |
| 11,170,394 B1 | 11/2021 | Macinski |
| 11,398,992 B1 | 7/2022 | Frechen et al. |
| 11,418,468 B1 | 8/2022 | Harris |
| 11,443,835 B1 | 9/2022 | Gangaikondan-Iyer et al. |
| 11,508,471 B1 | 11/2022 | Anselmi et al. |
| 11,514,137 B1 | 11/2022 | Kaye et al. |
| 11,562,437 B1 | 1/2023 | Hopkins et al. |
| 11,587,657 B2 | 2/2023 | Hopkins et al. |
| 11,610,240 B1 | 3/2023 | Burdine |
| 11,636,548 B1 | 4/2023 | Hopkins et al. |
| 11,640,618 B1 | 5/2023 | Burdine |
| 2001/0029483 A1 | 10/2001 | Schultz et al. |
| 2001/0037216 A1 | 11/2001 | Oscar et al. |
| 2001/0039589 A1 | 11/2001 | Aho et al. |
| 2001/0056359 A1 | 12/2001 | Abreu |
| 2002/0002495 A1 | 1/2002 | Ullman |
| 2002/0004812 A1 | 1/2002 | Motoyama |
| 2002/0032582 A1 | 3/2002 | Feeney et al. |
| 2002/0032583 A1 | 3/2002 | Joao |
| 2002/0035484 A1 | 3/2002 | McCormick |
| 2002/0087583 A1 | 7/2002 | Morgan et al. |
| 2002/0111832 A1 | 8/2002 | Judge |
| 2002/0133379 A1 | 9/2002 | Lewis et al. |
| 2002/0143579 A1 | 10/2002 | Docherty et al. |
| 2002/0147614 A1 | 10/2002 | Doerr et al. |
| 2002/0188552 A1 | 12/2002 | Kavounas et al. |
| 2002/0198831 A1 | 12/2002 | Patricelli et al. |
| 2003/0009367 A1 | 1/2003 | Morrison |
| 2003/0050796 A1 | 3/2003 | Baldwin |
| 2003/0050799 A1 | 3/2003 | Jay et al. |
| 2003/0069760 A1 | 4/2003 | Gelber |
| 2003/0074234 A1 | 4/2003 | Stasny |
| 2003/0097310 A1 | 5/2003 | Ono et al. |
| 2003/0130875 A1 | 7/2003 | Hawash et al. |
| 2003/0149625 A1 | 8/2003 | Leonardi et al. |
| 2003/0154163 A1 | 8/2003 | Phillips et al. |
| 2003/0172008 A1 | 9/2003 | Hage et al. |
| 2003/0187690 A1 | 10/2003 | Miller |
| 2003/0229540 A1 | 12/2003 | Algiene |
| 2003/0236747 A1 | 12/2003 | Sager |
| 2004/0006490 A1 | 1/2004 | Gingrich et al. |
| 2004/0039599 A1 | 2/2004 | Fralic |
| 2004/0054685 A1 | 3/2004 | Rahn et al. |
| 2004/0059607 A1 | 3/2004 | Ball et al. |
| 2004/0073456 A1 | 4/2004 | Gottlieb et al. |
| 2004/0073457 A1 | 4/2004 | Kalies |
| 2004/0078222 A1 | 4/2004 | Khan et al. |
| 2004/0078234 A1 | 4/2004 | Tallal, Jr. |
| 2004/0088187 A1 | 5/2004 | Chudy et al. |
| 2004/0103062 A1 | 5/2004 | Wood et al. |
| 2004/0117323 A1 | 6/2004 | Mindala |
| 2004/0148198 A1 | 7/2004 | Kalies |
| 2004/0153336 A1 | 8/2004 | Virdee et al. |
| 2004/0199545 A1 | 10/2004 | Wagner et al. |
| 2004/0236630 A1 | 11/2004 | Kost et al. |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0065821 A1 | 3/2005 | Kalies, Jr. |
| 2005/0075932 A1 | 4/2005 | Mankoff |
| 2005/0080692 A1 | 4/2005 | Padam et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240442 A1 | 10/2005 | Lapsker et al. |
| 2005/0240473 A1 | 10/2005 | Ayers, Jr. et al. |
| 2005/0261939 A1 | 11/2005 | Augspurger et al. |
| 2005/0288972 A1 | 12/2005 | Marvin et al. |
| 2006/0020514 A1 | 1/2006 | Yered |

(56) References Cited

U.S. PATENT DOCUMENTS

| | | |
|---|---|---|
| 2006/0026041 A1 | 2/2006 | Ullman |
| 2006/0036470 A1 | 2/2006 | Oaks |
| 2006/0085231 A1 | 4/2006 | Brofman |
| 2006/0085385 A1 | 4/2006 | Foster et al. |
| 2006/0113376 A1 | 6/2006 | Reed et al. |
| 2006/0149595 A1 | 7/2006 | Williams et al. |
| 2006/0149784 A1 | 7/2006 | Tholl et al. |
| 2006/0184391 A1 | 8/2006 | Barre et al. |
| 2006/0212318 A1 | 9/2006 | Dooley |
| 2006/0212345 A1 | 9/2006 | Soza et al. |
| 2006/0224414 A1 | 10/2006 | Astrup et al. |
| 2006/0224417 A1 | 10/2006 | Werner |
| 2006/0224443 A1 | 10/2006 | Soza et al. |
| 2006/0235747 A1 | 10/2006 | Hammond et al. |
| 2006/0259363 A1 | 11/2006 | Jhetam et al. |
| 2007/0005402 A1 | 1/2007 | Kennedy et al. |
| 2007/0033137 A1 | 2/2007 | Provost et al. |
| 2007/0043589 A1 | 2/2007 | Warren et al. |
| 2007/0043595 A1 | 2/2007 | Pederson |
| 2007/0050209 A1 | 3/2007 | Yered |
| 2007/0050210 A1 | 3/2007 | Wiley, II |
| 2007/0067186 A1 | 3/2007 | Brenner et al. |
| 2007/0094133 A1 | 4/2007 | Anandarao et al. |
| 2007/0108053 A1 | 5/2007 | Cramer et al. |
| 2007/0136100 A1 | 6/2007 | Daugherty et al. |
| 2007/0162303 A1 | 7/2007 | Wiley et al. |
| 2007/0168228 A1 | 7/2007 | Lawless |
| 2007/0185799 A1 | 8/2007 | Harrison et al. |
| 2007/0191985 A1 | 8/2007 | Bain |
| 2007/0194352 A1 | 8/2007 | Han |
| 2007/0202886 A1 | 8/2007 | Dhebri et al. |
| 2007/0204043 A1 | 8/2007 | Espinosa et al. |
| 2007/0219813 A1 | 9/2007 | Moore |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2007/0250341 A1 | 10/2007 | Howe et al. |
| 2007/0260750 A1 | 11/2007 | Feied et al. |
| 2007/0276697 A1 | 11/2007 | Wiley et al. |
| 2007/0294765 A1 | 12/2007 | Rihn et al. |
| 2007/0299915 A1 | 12/2007 | Shraim et al. |
| 2008/0033750 A1 | 2/2008 | Swiss et al. |
| 2008/0103836 A1 | 5/2008 | Park et al. |
| 2008/0112411 A1 | 5/2008 | Stafford et al. |
| 2008/0152107 A1 | 6/2008 | Mendiola |
| 2008/0183492 A1 | 7/2008 | Warren et al. |
| 2008/0215361 A1 | 9/2008 | Nunnari et al. |
| 2008/0262948 A1 | 10/2008 | Grady et al. |
| 2009/0006141 A1 | 1/2009 | Karr |
| 2009/0030719 A1 | 1/2009 | Nadas et al. |
| 2009/0064330 A1 | 3/2009 | Shraim et al. |
| 2009/0083064 A1 | 3/2009 | Mahinda |
| 2009/0094051 A1 | 4/2009 | Ard et al. |
| 2009/0100099 A1 | 4/2009 | Buckwalter |
| 2009/0106313 A1 | 4/2009 | Boldyga |
| 2009/0112707 A1 | 4/2009 | Weiss et al. |
| 2009/0198510 A1 | 8/2009 | Ditto |
| 2009/0204477 A1 | 8/2009 | Urso |
| 2009/0287558 A1 | 11/2009 | Seth et al. |
| 2009/0313112 A1 | 12/2009 | Champ et al. |
| 2009/0327363 A1 | 12/2009 | Cullen et al. |
| 2010/0030667 A1 | 2/2010 | Chudy et al. |
| 2010/0070298 A1 | 3/2010 | Kalies |
| 2010/0144259 A1 | 6/2010 | Allexon et al. |
| 2010/0145730 A1 | 6/2010 | Abreu |
| 2010/0161353 A1 | 6/2010 | Mayaud |
| 2010/0217622 A1 | 8/2010 | Brown et al. |
| 2010/0285821 A1 | 11/2010 | Smeeding et al. |
| 2010/0287001 A1 | 11/2010 | Pearce et al. |
| 2010/0293236 A1 | 11/2010 | Wisner et al. |
| 2011/0015978 A1 | 1/2011 | Welch, Jr. |
| 2011/0112871 A1 | 5/2011 | Simonowski et al. |
| 2011/0161109 A1 | 6/2011 | Pinsonneault et al. |
| 2011/0196697 A1 | 8/2011 | Akers |
| 2011/0288925 A1 | 11/2011 | Thomas et al. |
| 2012/0053958 A1 | 3/2012 | Marshall et al. |
| 2012/0109839 A1 | 5/2012 | Anderson et al. |
| 2012/0136809 A1 | 5/2012 | Cannata et al. |
| 2012/0143627 A1 | 6/2012 | Ruben et al. |
| 2012/0166268 A1 | 6/2012 | Griffiths |
| 2012/0179481 A1 | 7/2012 | Patel et al. |
| 2012/0185263 A1 | 7/2012 | Emert |
| 2012/0185264 A1 | 7/2012 | Demogenes et al. |
| 2012/0253829 A1 | 10/2012 | John et al. |
| 2012/0253830 A1* | 10/2012 | John ................. G06Q 30/00 705/2 |
| 2012/0253831 A1 | 10/2012 | John et al. |
| 2012/0253832 A1 | 10/2012 | John et al. |
| 2012/0253833 A1 | 10/2012 | John et al. |
| 2012/0253846 A1 | 10/2012 | John et al. |
| 2012/0265591 A1 | 10/2012 | Hwang |
| 2012/0323608 A1 | 12/2012 | Herzlinger |
| 2013/0041968 A1 | 2/2013 | Cohen et al. |
| 2013/0046610 A1 | 2/2013 | Abraham |
| 2013/0103602 A1 | 4/2013 | Melnick et al. |
| 2013/0144715 A1 | 6/2013 | Kranzley et al. |
| 2013/0179180 A1 | 7/2013 | Patra |
| 2013/0191147 A1* | 7/2013 | Harrell .............. G06Q 30/0211 705/2 |
| 2013/0197980 A1 | 8/2013 | Lerner et al. |
| 2013/0246082 A1 | 9/2013 | Brylawski et al. |
| 2013/0311389 A1 | 11/2013 | Kaehler et al. |
| 2014/0039911 A1 | 2/2014 | Iyer |
| 2014/0088985 A1 | 3/2014 | Grant et al. |
| 2014/0214435 A1 | 7/2014 | Previdi |
| 2014/0249861 A1 | 9/2014 | Gamble et al. |
| 2014/0249864 A1 | 9/2014 | Sultan et al. |
| 2014/0278448 A1 | 9/2014 | Sadeghi et al. |
| 2014/0278456 A1 | 9/2014 | Milosevich et al. |
| 2014/0278531 A1 | 9/2014 | Gupta |
| 2015/0032465 A1 | 1/2015 | Sundar et al. |
| 2015/0088557 A1 | 3/2015 | Huynh et al. |
| 2015/0142479 A1 | 5/2015 | Porter et al. |
| 2015/0149197 A1 | 5/2015 | Guinan |
| 2015/0154565 A1 | 6/2015 | Kaehler et al. |
| 2015/0154588 A1 | 6/2015 | Purves et al. |
| 2015/0195224 A1 | 7/2015 | Karnin et al. |
| 2015/0213195 A1 | 7/2015 | Blechman |
| 2015/0234991 A1 | 8/2015 | Pinsonneault |
| 2015/0235177 A1 | 8/2015 | Shraim et al. |
| 2015/0269695 A1 | 9/2015 | Pinsonneault et al. |
| 2015/0278472 A1 | 10/2015 | King |
| 2015/0332422 A1 | 11/2015 | Gilmartin |
| 2015/0371000 A1 | 12/2015 | Pinsonneault |
| 2016/0012465 A1 | 1/2016 | Sharp |
| 2016/0103978 A1 | 4/2016 | Stong |
| 2016/0140593 A1 | 5/2016 | Smeeding et al. |
| 2016/0213512 A1 | 7/2016 | Palanker et al. |
| 2016/0267544 A1 | 9/2016 | Flood et al. |
| 2016/0267545 A1 | 9/2016 | Glass et al. |
| 2016/0307195 A1 | 10/2016 | Cantwell et al. |
| 2016/0321406 A1 | 11/2016 | Timmerman et al. |
| 2016/0321410 A1 | 11/2016 | Timmerman et al. |
| 2016/0358142 A1 | 12/2016 | Hillen |
| 2016/0358293 A1 | 12/2016 | Berger et al. |
| 2016/0359795 A1 | 12/2016 | Fehling |
| 2017/0034087 A1 | 2/2017 | Borenstein et al. |
| 2017/0039331 A1* | 2/2017 | Bezdek ............... G06Q 10/10 |
| 2017/0220768 A1 | 8/2017 | Tanner, Jr. et al. |
| 2017/0255759 A1 | 9/2017 | McGrath |
| 2017/0323295 A1 | 11/2017 | Kranzley et al. |
| 2017/0324695 A1 | 11/2017 | Fischer et al. |
| 2017/0329922 A1 | 11/2017 | Eberting et al. |
| 2018/0012244 A1 | 1/2018 | Leonardi |
| 2018/0075212 A1* | 3/2018 | Kubey .............. G06Q 10/087 |
| 2018/0075215 A1 | 3/2018 | Loiacoono |
| 2018/0366810 A1 | 12/2018 | Nero et al. |
| 2019/0095582 A1 | 3/2019 | Waits |
| 2019/0213212 A1 | 7/2019 | Adato et al. |
| 2019/0252049 A1 | 8/2019 | Fotsch et al. |
| 2019/0385733 A1 | 12/2019 | Kaye et al. |
| 2019/0385734 A1 | 12/2019 | Pinsonneault |
| 2020/0105392 A1 | 4/2020 | Karkazis et al. |
| 2020/0372988 A1 | 11/2020 | Bezdek et al. |

(56) References Cited

U.S. PATENT DOCUMENTS

| | | |
|---|---|---|
| 2021/0319887 A1 | 10/2021 | Derrick, Jr. et al. |
| 2021/0374872 A1 | 12/2021 | Stewart et al. |
| 2021/0374876 A1 | 12/2021 | Cedergreen |

FOREIGN PATENT DOCUMENTS

| | | |
|---|---|---|
| CA | 2792252 A1 | 4/2013 |
| CA | 2810686 A1 | 10/2013 |
| CN | 102362778 | 2/2012 |
| KR | 100755440 | 9/2007 |
| KR | 100793852 | 1/2008 |
| KR | 101038074 | 6/2011 |
| KR | 101101692 | 12/2011 |
| KR | 20110138108 | 12/2011 |
| KR | 20110138572 | 12/2011 |
| KR | 101154858 | 6/2012 |
| WO | WO 1991/006917 A1 | 5/1991 |
| WO | WO 1995/003569 A2 | 2/1995 |
| WO | WO 1997/025682 A1 | 7/1997 |
| WO | WO 1998/050871 A1 | 11/1998 |
| WO | WO 2000/039737 A1 | 7/2000 |
| WO | WO 2003/098401 A2 | 11/2003 |
| WO | WO 2007/025295 A2 | 3/2007 |
| WO | WO 2007/094772 A1 | 8/2007 |
| WO | WO 2008/092109 A2 | 7/2008 |

OTHER PUBLICATIONS

United States Patent and Trademark Office, Non-Final Office Action received for U.S. Appl. No. 17/144,426, dated Jul. 13, 2023, 17 pages, U.S.

United States Patent and Trademark Office, Non-Final Office Action received for U.S. Appl. No. 17/158,118, dated Jul. 13, 2023, 18 pages, U.S.

United States Patent and Trademark Office, Non-Final Office Action received for U.S. Appl. No. 17/705,919, dated Aug. 17, 2023, 68 pages, US.

United States Patent and Trademark Office, Advisory Action received for U.S. Appl. No. 17/162,461, dated Aug. 24, 2023, 2 pages, US.

United States Patent and Trademark Office, Advisory Action received for U.S. Appl. No. 16/816,460, dated Aug. 1, 2024, 3 pages, U.S.

United States Patent and Trademark Office, Advisory Action received for U.S. Appl. No. 17/162,461, dated Aug. 19, 2024, 2 pages, U.S.

United States Patent and Trademark Office, Non-Final Office Action received for U.S. Appl. No. 18/098,150, dated Aug. 27, 2024, 61 pages, U.S.

United States Patent and Trademark Office, Interview Summary received for U.S. Appl. No. 17/675,616, dated Aug. 15, 2024, 8 pages, U.S.

United States Patent and Trademark Office, Non-Final Office Action received for U.S. Appl. No. 17/846,373, dated Apr. 5, 2024, 76 pages.

United States Patent and Trademark Office, Non-Final Office Action received for U.S. Appl. No. 17/674,366, dated Jun. 5, 2024, 54 pages, US.

United States Patent and Trademark Office, Final Office Action received for U.S. Appl. No. 17/162,461, dated Jun. 4, 2024, 38 pages, US.

Liu, Shiyong, et al., "Evaluating Cost-Effectiveness of Treatment Options for Diabetes Patients Using System Dynamics Modeling", Proceeding of the 2018 Winter Simulation Conference (WSC), Dec. 9-12, 2018, pp. 2577-2588, IEEE, Gothenburg, Sweden.

Tiriveedhi, V., "Impact of Precision Medicine on Drug Repositioning and Pricing: A Too Small to Thrive Crisis", Journal of Personalized Medicine, Nov. 5, 2018, 11 pages, vol. 8, No. 36, MDPI, Switzerland.

United States Patent and Trademark Office, Notice of Allowance received for U.S. Appl. No. 17/705,919, dated Sep. 3, 2024, 13 pages, USA.

United States Patent and Trademark Office, Notice of Allowance received for U.S. Appl. No. 17/675,616, dated Sep. 25, 2024, 21 pages, USA.

United States Patent and Trademark Office, Notice of Allowance received for U.S. Appl. No. 17/676,437, dated Sep. 25, 2024, 20 pages, USA.

United States Patent and Trademark Office, Examiner Interview Summary received for U.S. Appl. No. 18/098,150, dated Nov. 18, 2024, 3 pages, U.S.

United States Patent and Trademark Office, Non-Final Office Action received for U.S. Appl. No. 16/816,460, dated Nov. 21, 2024, 28 pages, US.

United States Patent and Trademark Office, Examiner Interview Summary received for U.S. Appl. No. 17/175,939, dated Dec. 3, 2024, 2 pages, US.

Coase, R. H., "The Nature of the Firm", Economica, Nov. 1937, pp. 386-405, vol. 4, No. 16, Blackwell Publishing for London School of Economics and Political Science, retrieved from the Internet at http://www.jstor.org/stable/2626876 on Nov. 7, 2011.

Gemmill, Marin, "The price elasticity of demand for prescription drugs: An exploration of demand in different settings", Doctor of Philosophy Thesis submitted to the London School of Economics and Political Science, Jan. 2008, 380 pages, UMI No. U615895, UMI Dissertation Publishing, ProQuest LLC, US.

United States Patent and Trademark Office, Advisory Action and Examiner-Initiated Interview Summary received for U.S. Appl. No. 17/705,919, dated Jun. 25, 2024, 33 pages, US.

United States Patent and Trademark Office, Examiner's Answer received for U.S. Appl. No. 16/867,286, dated Jun. 28, 2024, 9 pages, US.

United States Patent and Trademark Office, Non-Final Office Action received for U.S. Appl. No. 17/144,426, dated Jul. 18, 2024, 19 pages, US.

United States Patent and Trademark Office, Non-Final Office Action received for U.S. Appl. No. 17/158,118, dated Jul. 18, 2024, 22 pages, US.

United States Patent and Trademark Office, Notice of Allowance received for U.S. Appl. No. 17/846,373, dated Jul. 25, 2024, 16 pages, US.

Bowman, Michelle, et al., "Risk Assessment of Pharmacies & Electronic Prescriptions," 2019 IEEE/ACM International Conference on Advances in Social Networks Analysis and Mining (ASONAM), Aug. 27-30, 2019, pp. 641-644, Vancouver, BC, Canada.

United States Patent and Trademark Office, Final Office Action received for U.S. Appl. No. 16/816,460, dated May 3, 2024, 22 pages, U.S.

United States Patent and Trademark Office, Non-Final Office Action received for U.S. Appl. No. 17/675,616, dated May 8, 2024, 74 pages, U.S.

United States Patent and Trademark Office, Non-Final Office Action received for U.S. Appl. No. 17/676,437, dated May 9, 2024, 73 pages, U.S.

United States Patent and Trademark Office, Final Office Action received for U.S. Appl. No. 16/867,286, dated Sep. 19, 2023, 16 pages, US.

United States Patent and Trademark Office, Advisory Action received for U.S. Appl. No. 16/816,460, dated Oct. 19, 2023, 3 pages, US.

United States Patent and Trademark Office, Non-Final Office Action received for U.S. Appl. No. 17/162,461, dated Oct. 19, 2023, 25 pages, US.

United States Patent and Trademark Office, Advisory Action received for U.S. Appl. No. 17/144,426, dated Mar. 21, 2024, 5 pages.

United States Patent and Trademark Office, Advisory Action received for U.S. Appl. No. 17/674,366, dated Mar. 22, 2024, 6 pages.

United States Patent and Trademark Office, Final Office Action received for U.S. Appl. No. 17/705,919, dated Feb. 28, 2024, 61 pages.

United States Patent and Trademark Office, Final Office Action received for U.S. Appl. No. 17/175,939, dated Mar. 1, 2024, 24 pages.

United States Patent and Trademark Office, Examiner Interview Summary received for U.S. Appl. No. 17/144,426, dated Oct. 22, 2024, 8 pages, U.S.

(56) References Cited

OTHER PUBLICATIONS

United States Patent and Trademark Office, Examiner Interview Summary received for U.S. Appl. No. 17/158,118, dated Oct. 22, 2024, 8 pages, U.S.

United States Patent and Trademark Office, Non-Final Office Action received for U.S. Appl. No. 17/501,532, dated Oct. 17, 2024, 37 pages, U.S.

United States Patent and Trademark Office, Non-Final Office Action received for U.S. Appl. No. 17/499,976, dated Oct. 1, 2024, 79 pages, U.S.

United States Patent and Trademark Office, Non-Final Office Action received for U.S. Appl. No. 17/175,939, dated Oct. 24, 2024, 17 pages, U.S.

U.S. Appl. No. 16/816,460, "Adaptive System and Method for Adjudicating Claims to Reduce Member Responsibility", Unpublished (Filing Date Mar. 12, 2020), (Michael Rea, Inventor), (RC Savings, LLC, Assignee).

United States Patent and Trademark Office, Non-Final Office Action received for U.S. Appl. No. 16/816,460, dated Mar. 3, 2023, 14 pages, U.S.

United States Patent and Trademark Office, Final Office Action received for U.S. Appl. No. 17/162,461, dated May 19, 2023, 23 pages, U.S.

United States Patent and Trademark Office, Advisory Action received for U.S. Appl. No. 17/158,118, dated May 26, 2023, 5 pages, U.S.

United States Patent and Trademark Office, Non-Final Office Action received for U.S. Appl. No. 17/674,366, dated Jun. 6, 2023, 75 pages, U.S.

United States Patent and Trademark Office, Miscellaneous Office Action, Restarting Period, received for U.S. Appl. No. 17/175,939, dated Jun. 14, 2023, 23 pages, U.S.

Viswanthan, Meera, et al., "Interventions to Improve Adherence to Self-administered Medications for Chronic Diseases in the United States," Annals of Internal Medicine, Dec. 4, 2012, retrieved from the Internet at <https://www.acpjournals.org/doi/full/10.7326/0003-4819-157-11-201212040-00538?rfr_dat=cr_pub++0pubmed&url_ver=Z39.88-2003&rfr_id=ori%3Arid%3Acrossref.org> on Jun. 14, 2023, 25 pages.

United States Patent and Trademark Office, Final Office Action received for U.S. Appl. No. 17/144,426, dated Dec. 19, 2024, 22 pages, U.S.

United States Patent and Trademark Office, Final Office Action received for U.S. Appl. No. 17/158,118, dated Dec. 19, 2024, 24 pages, US.

"Pharmacy Reject Codes" NCPDP, 5 pages.

"St. Vincent's first to use Birmingham startup's information system." The Birmingham News [Online] Apr. 11, 2005. URL: http://www.awarix.com.

"St. Vincent's is Digital Flagship" D. Lockridge; Birmingham Medical News [Online] Sep. 2005.

"Two automatic identification technology, neither new in the sense if being recent developments . . . " Patient Safety & Quality Healthcare [Online] Aug. 2005_ URL: http://www_awarix.com.

Advisory Action for U.S. Appl. No. 14/193,294 mailed Nov. 9, 2017, 3 pages.

Advisory Action for U.S. Appl. No. 15/085,166 dated Apr. 11, 2019, 4 pages.

Advisory Action for U.S. Appl. No. 15/085,166 dated Apr. 29, 2020, 3 pages.

Advisory Action for U.S. Appl. No. 15/137,371 mailed Feb. 25, 2019, 5 pages.

Advisory Action for U.S. Appl. No. 15/427,746 mailed Jul. 2, 2019, 2 pages.

Advisory Action received for U.S. Appl. No. 15/085,166, dated Jan. 29, 2021, 3 pages, US.

Almaro, Moshe; "Recovery and Reuse of Unused Prescription Drugs" MIT What Matters: Aug. 2005.

American Hospital Association, "Drug Price Proposals", dated Apr. 2019, retrieved from the Internet at <URL: https://www.aha.org/system/files/media/file/2019/04/aha-drug-policy-recommendations_2.pdf>, 8 pages.

American Society of Health-System Pharmacists (ASHP), "Is Prescribing the Next Step in the Evolution of Pharmacy?" May 15, 2012.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Anonymous, Medic; On-line Goes In-House, Chain Store Age Executive, Jan. 1987, vol. 63, Issue 1, USA; Abstract only.

Anonymous, Pharmacy Industry Leaders Launch Firm to Supply Real-Time Data, PR Newswire, Jul. 30, 2001, p. 1, New York, NY, USA.

Anonymous, TechRx Announces Successful Beta Deployment of T-Rex. PR Newswire. May 13, 2002.

California Health Care Foundation, "When the Price Is Not Right: State Options on Prescription Drug Pricing", dated Jun. 2016, retrieved from the Internet at: <URL: https://www.chcf.org/wp-content/uploads/2017/12/PDF-WhenStateRxPricing.pdf>, 16 pages.

Cepeda, Maria Soledad, et al., "Quantification of missing prescriptions in commercial claims databases : results of a cohort study.", Pharmacoepidemiology and Drug Safety, Apr. 2017, pp. 386-392, vol. 26, Epub Jan. 25, 2017 on Wiley Online Library.

Chu, Kuan-Yu, et al., "Incremental analysis of the reengineering of an outpatient billing process: an empirical study in a public hospital", BMC Health Services Research, Jun. 13, 2013, vol. 13, No. 215, 8 pages, BioMed Central Ltd, UK.

CMS Updates Drug Dashboards with Prescription Drug Pricing and Spending Data, Data, Medicare Part D, Prescription drugs (Mar. 14, 2019).

Consalvo, Bob; "City of Boston in the City Council" hearing notice, Dec. 6, 2006.

Coping with Information Overload. The News Source for Healthcare Information Technology [Online] Nov. 2004. URL: http://www.awarix.com.

Decision to Grant European Patent Application No. 13809457.8 dated May 18, 2017.

Dubois, Robert W., "Rx Drug Costs: List Prices Versus Net Prices and the Importance of Staying Within the Data", Health Affairs Blog, Mar. 2019, 7 pages.

Examiner's Answer for U.S. Appl. No. 14/145,027 mailed Sep. 7, 2016, 27 pages.

Extended European Search Report for European Application No. 13809457.8 dated Apr. 15, 2016, 6 pages.

Final Office Action for U.S. Appl. No. 12/140,015 mailed Jan. 31, 2011, 10 pages.

Final Office Action for U.S. Appl. No. 12/415,062 mailed Oct. 6, 2011, 18 pages.

Final Office Action for U.S. Appl. No. 12/555,589 mailed Apr. 11, 2012, 17 pages.

Final Office Action for U.S. Appl. No. 12/560,071 mailed Aug. 28, 2015, 8 pages.

Final Office Action for U.S. Appl. No. 12/560,071 mailed Nov. 8, 2012, 11 pages.

Final Office Action for U.S. Appl. No. 12/570,982 mailed Apr. 11, 2014, 22 pages.

Final Office Action for U.S. Appl. No. 12/570,982 mailed Aug. 28, 2015, 10 pages.

Final Office Action for U.S. Appl. No. 12/570,982 mailed Jan. 17, 2013, 19 pages.

Final Office Action for U.S. Appl. No. 12/730,015 mailed Aug. 14, 2012, 10 pages.

Final Office Action for U.S. Appl. No. 12/978,898 mailed May 16, 2013, 16 pages.

Final Office Action for U.S. Appl. No. 13/721,890 mailed Jun. 24, 2015, 14 pages.

Final Office Action for U.S. Appl. No. 13/721,890 mailed Nov. 25, 2016, 12 pages.

(56) References Cited

OTHER PUBLICATIONS

Final Office Action for U.S. Appl. No. 13/782,909 mailed May 31, 2016, 18 pages.
Final Office Action for U.S. Appl. No. 13/782,909 mailed Oct. 6, 2015, 24 pages.
Final Office Action for U.S. Appl. No. 13/804,175 mailed Oct. 6, 2015, 6 pages.
Final Office Action for U.S. Appl. No. 13/827,676 mailed Jul. 13, 2015, 17 pages.
Final Office Action for U.S. Appl. No. 14/090,113 mailed Jan. 6, 2016, 18 pages.
Final Office Action for U.S. Appl. No. 14/090,122 mailed Apr. 22, 2016, 13 pages.
Final Office Action for U.S. Appl. No. 14/145,027 mailed Nov. 19, 2015, 12 pages.
Final Office Action for U.S. Appl. No. 14/193,294 mailed May 2, 2016, 29 pages.
Final Office Action for U.S. Appl. No. 14/218,326 mailed Jun. 30, 2016, 17 pages.
Final Office Action for U.S. Appl. No. 15/085,166, dated Dec. 4, 2020, 11 pages.
Final Office Action for U.S. Appl. No. 15/137,371 mailed Nov. 28, 2018, 24 pages.
Final Office Action for U.S. Appl. No. 15/427,746 mailed Apr. 15, 2019, 9 pages.
Google NPL (non-patent literature) Search on "pharmacy payment benefit copay NDC database", retrieved from the Internet at <https://scholar.google.com/scholar?hl= en&as_sdt=3,47&g-pharmacy+payment+benefit+copay+NDC+database> on Feb. 20, 2022 at 3:02 pm, 1 page.
Google NPL (non-patent literature) Search on "pharmacy payment benefit copay NDC database", retrieved from the Internet at <https://www.google.com/search?g=pharmacy+payment+benefit+copay+ndc+database&source=int&tbs=cdr%3A1%2Ccd_min%3A1%2F1%2F2010%2 . . . > on Feb. 20, 2022 at 3:00 pm, 2 pages.
Google Patents Search (including Web Search History, Prior Art Search Printable History Generator) on "pharmacy payment benefit copay NDC database) (prescription) (code) (refills) (error code) country: US before:filing:Dec. 31, 2013", retrieved from the Internet at <https://patents.google.com/?q=pharmacy+payment+benefit+copay+NDC+database&q-prescription&q=code&q=refills&q=error+code&country=US&before=filing:Dec. 31, 2013> retrieved on Jun. 1, 2022, 4 pages.
Google Scholar Search (including Web Search History, Prior Art Search Printable History Generator) on "pharmacy payment benefit copay NDC database prescription . . . ", retrieved from the Internet at <https://scholar.google.com/scholar?hl=en&as_sdt=0%2C47&as_ylo=2010&as_yhi=2013&q=pharmacy+payment+benefit+copay+NDC+database+pres . . . > retrieved on Jun. 1, 2022, 3 pages.
How to Estimate the Cost of a Prescription. Pam Olson, Sr. Client Services Executive, Navitus Health Solutions (Year: 2015).
Hsee, Christopher K., et al., "General Evaluability Theory", Perspectives on Psychological Science, Jul. 2010, pp. 343-355, vol. 5, No. 4, Sage Publications, Inc. on behalf of the Association for Psychological Science retrieved from the Internet at <URL: https://www.jstor.org/stable/41613442>.
Kamal, Rabah, et al., "What are the recent and forecasted trends in prescription drug spending?" Peterson-KFF Health System Tracker, Feb. 20, 2019, 19 pages, Peterson Center on Healthcare.
Kaplan et al., "Let the Needles Do the Talking! Evaluating the New Haven Needle Exchange." Interfaces 23:1, Jan.-Feb. 1993 (pp. 7-26).
Lamb, J., New Era of Electronic Medicine Management: E-PRESCRIPTIONS, Britain's Traditionally Cautious National Health Service is Starting Trials for Online Prescription, with the Aim of Cutting Costs, Finance Times, London, Feb. 21, 2001, p. 6, London, United Kingdom.
Letter Restarting Period for Response for U.S. Appl. No. 13/721,890 mailed Jan. 14, 2015, 11 pages.
Marie Chisholm et al. "Pharmaceutical Manufacturer Assistance Program." Arch Intern Med. vol. 162, Apr. 8, 2002.
Non-Final Office Action for U.S. Appl. No. 12/560,071 mailed Jun. 21, 2012, 11 pages.
Non-Final Office Action for U.S. Appl. No. 12/570,982 mailed Jun. 20, 2012, 10 pages.
Non-Final Office Action for U.S. Appl. No. 14/193,294 mailed Feb. 21, 2017, 32 pages.
Non-Final Office Action for U.S. Appl. No. 15/085,166 dated Jun. 12, 2020, 26 pages.
Non-Final Office Action for U.S. Appl. No. 16/180,915 dated Jun. 1, 2020, 40 pages.
Non-final Office Action for U.S. Appl. No. 12/140,015 mailed Oct. 8, 2010, 9 pages.
Non-final Office Action for U.S. Appl. No. 12/189,650 mailed Jan. 22, 2010, 11 pages.
Non-final Office Action for U.S. Appl. No. 12/189,654 mailed Jan. 22, 2010, 11 pages.
Non-Final Office Action for U.S. Appl. No. 12/388,956 mailed Feb. 3, 2011, 11 pages.
Non-Final Office Action for U.S. Appl. No. 12/415,062 mailed Mar. 30, 2011, 23 pages.
Non-Final Office Action for U.S. Appl. No. 12/555,589 mailed Dec. 9, 2011, 12 pages.
Non-Final Office Action for U.S. Appl. No. 12/560,071 mailed Sep. 23, 2014, 17 pages.
Non-Final Office Action for U.S. Appl. No. 12/570,982 mailed Sep. 12, 2013, 22 pages.
Non-Final Office Action for U.S. Appl. No. 12/730,015 mailed Mar. 6, 2012, 9 pages.
Non-Final Office Action for U.S. Appl. No. 12/956,411 mailed Jan. 24, 2011, 9 pages.
Non-Final Office Action for U.S. Appl. No. 12/978,898 mailed Feb. 6, 2013, 12 pages.
Non-Final Office Action for U.S. Appl. No. 12/982,395 mailed Dec. 11, 2012, 13 pages.
Non-Final Office Action for U.S. Appl. No. 13/721,890 mailed Jan. 9, 2015, 11 pages.
Non-Final Office Action for U.S. Appl. No. 13/721,890 mailed Jun. 14, 2016, 9 pages.
Non-final Office Action for U.S. Appl. No. 13/782,909 mailed Feb. 11, 2016, 17 pages.
Non-Final Office Action for U.S. Appl. No. 13/827,676 mailed Dec. 26, 2014, 13 pages.
Non-final Office Action for U.S. Appl. No. 13/827,676 mailed Dec. 30, 2015, 23 pages.
Non-Final Office Action for U.S. Appl. No. 14/145,027 mailed Mar. 23, 2015, 13 pages.
Non-Final Office Action for U.S. Appl. No. 15/137,371 mailed May 29, 2018, 19 pages.
Non-Final Office Action for U.S. Appl. No. 15/427,746 mailed Oct. 18, 2018, 9 pages.
Non-Final Office Action for U.S. Appl. No. 16/819,258 dated Sep. 4, 2020, 6 pages.
Non-Final Office Action received for U.S. Appl. No. 15/085,166, dated Mar. 17, 2021, 11 pages.
Non-Final Office Action received for U.S. Appl. No. 16/551,962, dated Mar. 2, 2021, 16 pages.
Non-Final Office Action received for U.S. Appl. No. 16/453,509 mailed Mar. 26, 2021, 45 pages.
Non-Final Office Action received for U.S. Appl. No. 16/832,318 mailed Apr. 23, 2021, 52 pages.
Notice of Allowance and Fees(s) Due for U.S. Appl. No. 15/925,011 dated Jan. 22, 2021, 15 pages.
Notice of Allowance for U.S. Appl. No. 16/180,915 dated Dec. 11, 2020, 23 pages.
Notice of Allowance for U.S. Appl. No. 11/674,069 mailed Jul. 19, 2010, 13 pages.
Notice of Allowance for U.S. Appl. No. 12/140,015 mailed Jun. 10, 2011, 10 pages.
Notice of Allowance for U.S. Appl. No. 12/165,221 mailed Nov. 16, 2010, 6 pages.

(56) References Cited

OTHER PUBLICATIONS

Notice of Allowance for U.S. Appl. No. 12/189,650 mailed Aug. 13, 2010, 11 pages.
Notice of Allowance for U.S. Appl. No. 12/388,956 mailed Jun. 14, 2011, 9 pages.
Notice of Allowance for U.S. Appl. No. 12/956,411 mailed Aug. 5, 2011, 8 pages.
Notice of Allowance for U.S. Appl. No. 12/982,395 mailed Apr. 24, 2013, 9 pages.
Notice of Allowance for U.S. Appl. No. 14/181,011 dated May 15, 2019, 9 pages.
Notice of Allowance for U.S. Appl. No. 15/137,371 mailed May 2, 2019, 11 pages.
Notice of Allowance for U.S. Appl. No. 15/427,746 mailed Dec. 4, 2019, 5 pages.
Notice of Allowance for U.S. Appl. No. 15/427,746 mailed Jul. 31, 2019, 8 pages.
Notice of Allowance received for U.S. Appl. No. 14/643,468, Oct. 24, 2018, 22 pages.
Notice of Allowance received for U.S. Appl. No. 14/181,011, Feb. 13, 2019, 9 pages.
Office Action for U.S. Appl. No. 14/193,294 dated Aug. 4, 2017, 31 pages.
Office Action for U.S. Appl. No. 14/193,294 dated Mar. 22, 2018, 28 pages.
Office Action for U.S. Appl. No. 14/193,294 dated Sep. 19, 2018, 27 pages.
Office Action for U.S. Appl. No. 14/229,043 dated Feb. 27, 2019, 18 pages.
Office Action for U.S. Appl. No. 14/229,043 dated Jul. 24, 2017, 19 pages.
Office Action for U.S. Appl. No. 14/229,043 dated Sep. 5, 2019, 22 pages.
Office Action for U.S. Appl. No. 14/229,043 dated Sep. 14, 2018, 17 pages.
Office Action for U.S. Appl. No. 14/643,468 dated Mar. 8, 2018, 11 pages.
Office Action for U.S. Appl. No. 15/085,166 dated Dec. 27, 2018, 24 pages.
Office Action for U.S. Appl. No. 15/085,166 dated Jun. 29, 2018, 19 pages.
Office Action for U.S. Appl. No. 15/085,166 dated Mar. 3, 2020, 25 pages.
Office Action for U.S. Appl. No. 15/085,166 dated Sep. 4, 2019, 23 pages.
Office Action for U.S. Appl. No. 15/422,184 dated Aug. 27, 2019, 16 pages.
Office Action for U.S. Appl. No. 15/422,184 dated Feb. 15, 2019, 15 pages.
Office Action for U.S. Appl. No. 15/422,184 dated Jan. 14, 2020, 19 pages.
Office Action for U.S. Appl. No. 15/422,184 dated Sep. 10, 2018, 13 pages.
Office Action for U.S. Appl. No. 15/925,011 dated Jun. 27, 2019, 15 pages.
Office Action for U.S. Appl. No. 15/925,011 dated Oct. 24, 2019, 19 pages.
Office Action for U.S. Appl. No. 15/925,948 dated Jun. 25, 2019, 13 pages.
Office Action for U.S. Appl. No. 15/925,948 dated Oct. 23, 2019, 18 pages.
Office Action for U.S. Appl. No. 12/570,982 mailed Apr. 8, 2015, 9 pages.
Office Action for U.S. Appl. No. 13/782,909 mailed Jun. 25, 2015, 16 pages.
Office Action for U.S. Appl. No. 13/804,175 mailed Mar. 13, 2015, 9 pages.
Office Action for U.S. Appl. No. 14/090,113 mailed Jun. 18, 2015, 14 pages.
Office Action for U.S. Appl. No. 14/090,122 mailed Oct. 21, 2016, 12 pages.
Office Action for U.S. Appl. No. 14/090,122 mailed Sep. 11, 2015, 10 pages.
Office Action for U.S. Appl. No. 14/181,011 mailed Feb. 29, 2016, 23 pages.
Office Action for U.S. Appl. No. 14/181,011 mailed Mar. 20, 2017, 28 pages.
Office Action for U.S. Appl. No. 14/181,011 mailed Oct. 20, 2016, 28 pages.
Office Action for U.S. Appl. No. 14/181,011 mailed Sep. 12, 2017, 17 pages.
Office Action for U.S. Appl. No. 14/193,294 mailed Dec. 17, 2015, 21 pages.
Office Action for U.S. Appl. No. 14/218,326 mailed Dec. 1, 2015, 13 pages.
Opar, Alisa; "Rising drug costs prompt new uses for old pills." Nature Medicine, 1211333 (2006).
PTAB Decision on Appeal for U.S. Appl. No. 14/145,027 mailed May 31, 2018, 11 pages.
PTAB Decision on Request for Rehearing for U.S. Appl. No. 14/145,027 mailed Aug. 30, 2018, 9 pages.
Sampson, R.J., Taking Control of Health Care Costs, Best's Review—Life Health Insurance Edition, Nov. 1983, vol. 84, Issue 7, USA; Abstract only.
Scientific and Technical Information Center, Report of Information from Dialog (NPL (non-patent literature) Search Results, Abstracts only), dated Nov. 1, 2021, (Year: 2021), 9 pages.
Siler, Sharon et al., "Safe Disposal of Unused Controlled Substances" Avalere Health 2008.
Strom, Stephanie; "Old Pills Finding New Medicine Cabinets" NY Times, May 18, 2005.
Subnotebooks, Phones, and More St. Vincent's Gets on Track. Mobile Health Data [Online], Nov. 19, 2004. URL:http://www.awarix.com.
Supplemental Notice of Allowability received for U.S. Appl. No. 16/180,915, dated Jan. 28, 2021, 2 pages.
Supplemental Notice of Allowability received for U.S. Appl. No. 16/180,915, dated Mar. 12, 2021, 10 pages.
U.S. Notice of Allowance received for U.S. Appl. No. 16/819,258, dated Nov. 16, 2020, 8 pages, U.S.
U.S. Appl. No. 14/229,043, "Systems and Methods for Monitoring and Reporting Redemption Information at a Pharmacy for Patient Incentive Information Identified at the Time of Prescribing," Unpublished (Filed Mar. 28, 2014), (Roger Pinsonneault, Inventor), (McKesson Corporation, Assignee), abandoned.
U.S. Appl. No. 15/084,034, "Prescription Provider System," Unpublished (Filed Mar. 29, 2016), (Scott Genone, Inventor), (McKesson Corporation, Assignee), abandoned.
U.S. Appl. No. 16/867,286, "Method, Apparatus, and Computer Program Product for Constructing Electronic Message Responses Dependent Upon Historical Information," Unpublished (filed May 5, 2020), (Jared Burdine, et al., Inventor) (McKesson Corporation, Assignee), pending.
U.S. Appl. No. 17/144,426, "Method, Apparatus, and Computer Program Product for Estimating a Target Quantitative Measure Based Upon Historical Electronic Messages," Unpublished (filed Jan. 8, 2021), (Stewart Aragon, et al., Inventor) (McKesson Corporation, Assignee), pending.
U.S. Appl. No. 17/158,118, "Method, Apparatus, and Computer Program Product for Estimating a Target Quantitative Measure Based Upon Historical Electronic Messages," Unpublished (filed Jan. 26, 2021), (Stewart Aragon, et al., Inventor) (McKesson Corporation, Assignee), pending.
U.S. Appl. No. 17/162,461, "Method, Apparatus, and Computer Program Product for Constructing Electronic Message Responses Dependent Upon Historical Information," Unpublished (filed Jan. 19, 2021), (Stewart Aragon, et al., Inventor) (McKesson Corporation, Assignee), pending.
U.S. Appl. No. 17/175,939, "Method, Apparatus, and Computer Program Product for Generating Inquiries in Different Formats, and Compiling Different Information Types in a Response," Unpub-

(56) References Cited

OTHER PUBLICATIONS lished (filed Feb. 15, 2021), (Stacy Hopkins, et al., Inventor) (McKesson Corporation, Assignee), pending.
U.S. Appl. No. 17/499,976, "Method, Apparatus, and Computer Program Product for Providing Real-Time Pricing Information," Unpublished (filed Oct. 13, 2021), (Stacy Hopkins, et al., Inventor) (McKesson Corporation, Assignee), pending.
U.S. Appl. No. 17/501,532, "Method, Apparatus, and Computer Program Product for Providing Real-Time Pricing Information," Unpublished (filed Oct. 14, 2021), (Keith Crozier, et al., Inventor) (McKesson Corporation, Assignee), pending.
U.S. Appl. No. 17/675,616, "Method, Apparatus, and Computer Program Product for Reformatting an Electronic Prescription Transaction," Unpublished (filed Feb. 18, 2022), (Phillip Draa, et al., Inventor) (McKesson Corporation, Assignee), pending.
U.S. Appl. No. 17/676,437, "Method, Apparatus, and Computer Program Product for Partitioning Prescription Transaction Costs in An Electronic Prescription Transaction," Unpublished (filed Feb. 21, 2022), (Phillip Draa, et al., Inventor) (McKesson Corporation, Assignee), pending.
U.S. Appl. No. 17/705,919, "Method, Apparatus, and Computer Program Product for Generating Alternative Evaluation Messages," Unpublished (filed Mar. 28, 2022), (Stacy Hopkins, et al., Inventor) (McKesson Corporation, Assignee), pending.
U.S. Appl. No. 17/846,373, "Alternative Therapy Identification System," Unpublished (filed Jun. 22, 2022), (Elizabeth S. Kaye, et al., Inventor) (McKesson Corporation, Assignee), pending.
United States Patent and Trademark Office, Advisory Action for U.S. Appl. No. 15/422,184, Jun. 25, 2019, 4 pages, U.S.A.
United States Patent and Trademark Office, Advisory Action for U.S. Appl. No. 15/422,184, Mar. 26, 2020, 5 pages, U.S.A.
United States Patent and Trademark Office, Advisory Action for U.S. Appl. No. 15/925,011, Jan. 31, 2020, 3 pages, U.S.A.
United States Patent and Trademark Office, Advisory Action for U.S. Appl. No. 15/925,948, Jan. 31, 2020, 4 pages, U.S.A.
United States Patent and Trademark Office, Advisory Action received for U.S. Appl. No. 16/453,509, dated Oct. 12, 2021, 5 pages, U.S.
United States Patent and Trademark Office, Advisory Action received for U.S. Appl. No. 16/832,318, dated Jan. 28, 2022, 4 pages, U.S.
United States Patent and Trademark Office, Advisory Action received for U.S. Appl. No. 16/792,413, dated Mar. 10, 2022, 4 pages, US.
United States Patent and Trademark Office, Advisory Action received for U.S. Appl. No. 16/867,286, dated Dec. 6, 2022, 8 pages, US.
United States Patent and Trademark Office, Advisory Action received for U.S. Appl. No. 17/175,939, dated Dec. 22, 2022, 5 pages, US.
United States Patent and Trademark Office, Advisory Action received for U.S. Appl. No. 16/867,286, dated Feb. 6, 2023, 3 pages, US.
United States Patent and Trademark Office, Advisory Action received for U.S. Appl. No. 17/144,426, dated Mar. 3, 2023, 6 pages, US.
United States Patent and Trademark Office, Corrected Notice of Allowability received for U.S. Appl. No. 15/085,166, dated Sep. 20, 2021, 6 pages, U.S.
United States Patent and Trademark Office, Final Office Action received for U.S. Appl. No. 16/453,509, dated Aug. 18, 2021, 16 pages, U.S.
United States Patent and Trademark Office, Final Office Action received for U.S. Appl. No. 16/551,962, dated Nov. 4, 2021, 32 pages, U.S.
United States Patent and Trademark Office, Final Office Action received for U.S. Appl. No. 16/832,318, dated Nov. 3, 2021, 22 pages, U.S.
United States Patent and Trademark Office, Final Office Action received for U.S. Appl. No. 16/792,413, dated Jan. 10, 2022, 80 pages, U.S.
United States Patent and Trademark Office, Final Office Action received for U.S. Appl. No. 17/012,565, dated Jul. 25, 2022, 43 pages, U.S.
United States Patent and Trademark Office, Final Office Action received for U.S. Appl. No. 16/867,286, dated Sep. 8, 2022, 19 pages, U.S.
United States Patent and Trademark Office, Final Office Action received for U.S. Appl. No. 17/175,939, dated Oct. 5, 2022, 30 pages, U.S.
United States Patent and Trademark Office, Final Office Action received for U.S. Appl. No. 17/144,426, dated Dec. 8, 2022, 21 pages, US.
United States Patent and Trademark Office, Final Office Action received for U.S. Appl. No. 17/158,118, dated Mar. 3, 2023, 19 pages, US.
United States Patent and Trademark Office, Non-Final Office Action received for U.S. Appl. No. 16/792,413, dated Aug. 5, 2021, 32 pages, U.S.
United States Patent and Trademark Office, Non-Final Office Action received for U.S. Appl. No. 15/085,166, dated Jan. 10, 2022, 12 pages, U.S.
United States Patent and Trademark Office, Non-Final Office Action received for U.S. Appl. No. 16/867,286, dated Feb. 22, 2022, 38 pages, U.S.
United States Patent and Trademark Office, Non-Final Office Action received for U.S. Appl. No. 17/012,565, dated Apr. 12, 2022, 19 pages, U.S.A.
United States Patent and Trademark Office, Non-Final Office Action received for U.S. Appl. No. 16/453,509, dated Apr. 28, 2022, 16 pages, U.S.A.
United States Patent and Trademark Office, Non-Final Office Action received for U.S. Appl. No. 16/552,021, dated May 3, 2022, 60 pages, U.S.A.
United States Patent and Trademark Office, Non-Final Office Action received for U.S. Appl. No. 17/175,939, dated May 12, 2022, 48 pages, U.S.A.
United States Patent and Trademark Office, Non-Final Office Action received for U.S. Appl. No. 16/792,413, dated May 24, 2022, 48 pages, US.
United States Patent and Trademark Office, Non-Final Office Action received for U.S. Appl. No. 17/144,426, dated May 31, 2022, 42 pages, US.
United States Patent and Trademark Office, Non-Final Office Action received for U.S. Appl. No. 16/832,318, dated Jun. 8, 2022, 17 pages, US.
United States Patent and Trademark Office, Nonfinal Office Action received for U.S. Appl. No. 17/162,461, dated Oct. 5, 2022, 47 pages, U.S.
United States Patent and Trademark Office, Nonfinal Office Action received for U.S. Appl. No. 17/158,118, dated Oct. 7, 2022, 46 pages, U.S.
United States Patent and Trademark Office, Notice of Allowability received for U.S. Appl. No. 15/422,184, Nov. 16, 2020, 2 pages, U.S.A.
United States Patent and Trademark Office, Notice of Allowance and Fee(s) Due received for U.S. Appl. No. 17/219,526, dated Mar. 22, 2022, 11 pages, US.
United States Patent and Trademark Office, Notice of Allowance and Fee(s) Due received for U.S. Appl. No. 16/551,962, dated Mar. 16, 2022, 10 pages, US.
United States Patent and Trademark Office, Notice of Allowance and Fee(s) Due received for U.S. Appl. No. 17/092,705, dated Mar. 24, 2022, 9 pages, US.
United States Patent and Trademark Office, Notice of Allowance and Fee(s) Due received for U.S. Appl. No. 16/551,962, dated Mar. 1, 2022, 14 pages, US.
United States Patent and Trademark Office, Notice of Allowance received for U.S. Appl. No. 15/422,184, Oct. 13, 2020, 12 pages, U.S.A.
United States Patent and Trademark Office, Notice of Allowance received for U.S. Appl. No. 15/925,948, Nov. 5, 2020, 22 pages, U.S.A.
United States Patent and Trademark Office, Notice of Allowance received for U.S. Appl. No. 15/085,166, dated Sep. 10, 2021, 21 pages, U.S.
United States Patent and Trademark Office, Notice of Allowance received for U.S. Appl. No. 15/085,166, dated Jun. 15, 2022, 18 pages, U.S.

(56) References Cited

OTHER PUBLICATIONS

United States Patent and Trademark Office, Notice of Allowance received for U.S. Appl. No. 17/092,705, dated Dec. 23, 2021, 42 pages, U.S.

United States Patent and Trademark Office, Notice of Allowance received for U.S. Appl. No. 16/043,401, dated Aug. 10, 2020, 9 pages, U.S.A.

United States Patent and Trademark Office, Notice of Allowance received for U.S. Appl. No. 17/219,526, dated Feb. 3, 2022, 48 pages, U.S.

United States Patent and Trademark Office, Notice of Allowance received for U.S. Appl. No. 17/092,705, dated May 31, 2022, 9 pages, US.

United States Patent and Trademark Office, Notice of Allowance received for U.S. Appl. No. 17/219,526, dated Jun. 2, 2022, 8 pages, US.

United States Patent and Trademark Office, Notice of Allowance received for U.S. Appl. No. 16/551,962, dated Jun. 8, 2022, 11 pages, US.

United States Patent and Trademark Office, Notice of Allowance received for U.S. Appl. No. 16/792,413, dated Sep. 8, 2022, 18 pages, U.S.

United States Patent and Trademark Office, Notice of Allowance received for U.S. Appl. No. 17/012,565, dated Sep. 21, 2022, 11 pages, U.S.

United States Patent and Trademark Office, Notice of Allowance received for U.S. Appl. No. 16/453,509, dated Oct. 3, 2022, 23 pages, U.S.

United States Patent and Trademark Office, Notice of Allowance received for U.S. Appl. No. 16/552,021, dated Oct. 20, 2022, 14 pages, U.S.

United States Patent and Trademark Office, Notice of Allowance received for U.S. Appl. No. 16/832,318, dated Dec. 8, 2022, 26 pages, US.

United States Patent and Trademark Office, Office Action for U.S. Appl. No. 15/925,011, Apr. 8, 2020, 17 pages, U.S.A.

United States Patent and Trademark Office, Office Action for U.S. Appl. No. 15/925,948, Mar. 23, 2020, 29 pages, U.S.A.

United States Patent and Trademark Office, Office Action received for U.S. Appl. No. 15/422,184, May 18, 2020, 31 pages, U.S.A.

United States Patent and Trademark Office, Office Action received for U.S. Appl. No. 15/925,011, Oct. 8, 2020, 8 pages, U.S.A.

Van Nuys, Ph.D., Karen, et al., "Prescription Drug Copayment Coupon Landscape", Drug Pricing White Paper, USC Leonard D. Schaeffer Center for Health Policy and Economics, Feb. 7, 2018, retrieved from the Internet at <URL: https://healthpolicy.usc.edu/research/prescription-drug-copayment-coupon-landscape/>, 21 pages.

Wisconsin Physicians Service (WPS) Insurance Corporation, "How to Read Your Explanation of Benefits Chart," Jun. 16, 2012.

Www.ncoil.org/news/DrugCards2.doc dated Apr. 2002, 5 pages.

Zhu, V et al., "Data for drugs available through low-cost prescription drug programs are available through pharmacy benefit manager and claims data," BMC Clinical Pharmacology, Jun. 22, 2012, vol. 12, No. 12., BioMed Central Ltd., UK.

United States Patent and Trademark Office, Non-Final Office Action received for U.S. Appl. No. 16/867,286, dated Mar. 31, 2023, 16 pages, US.

United States Patent and Trademark Office, Non-Final Office Action received for U.S. Appl. No. 17/175,939, dated Apr. 26, 2023, 24 pages, US.

United States Patent and Trademark Office, Final Office Action received for U.S. Appl. No. 17/674,366, dated Dec. 15, 2023, 53 pages, US.

United States Patent and Trademark Office, Final Office Action received for U.S. Appl. No. 17/144,426, dated Dec. 19, 2023, 22 pages, US.

United States Patent and Trademark Office, Final Office Action received for U.S. Appl. No. 17/158,118, dated Dec. 19, 2023, 22 pages, US.

United States Patent and Trademark Office, Non-Final Office Action received for U.S. Appl. No. 16/816,460, dated Dec. 22, 2023, 46 pages, US.

United States Patent and Trademark Office, Notice of Allowance and Interview Summary received for U.S. Appl. No. 17/501,532, May 23, 2025, 21 pages, US.

United States Patent and Trademark Office, Advisory Action received for U.S. Appl. No. 17/501,532, Apr. 18, 2025, 3 pages, U.S.A.

United States Patent and Trademark Office, Notice of Allowance received for U.S. Appl. No. 17/144,426, Apr. 2, 2025, 9 pages, U.S.A.

Davies, Rory, "Specialty drugs: Four options for managing costs: with specialty drug costs growing at a double-digit pace and new drugs entering the market, plan sponsors struggle to keep up. The author describes challenges plan sponsors face with some particular high-cost drugs and offers four cost-control strategies", Essay, Benefits Magazine, Jun. 2017, 9 pages, vol. 54, No. 6, International Foundation of Employee Benefit Plans, US.

U.S. Appl. No. 17/491,870, "Method, Apparatus, and Computer Program Product for Using Machine Learning to Generate an Offset Amount", Unpublished (filing date Oct. 1, 2021), (Jared Burdine, Inventor), (McKesson Corporation, Assignee).

U.S. Appl. No. 19/053,907, "Method, Apparatus, and Computer Program Product for Evaluating Prescription Transaction in Accordance with a Database", Unpublished (filed Feb. 14, 2025), (Phillip Draa, Inventor), (McKesson Corporation, Assignee).

U.S. Appl. No. 19/053,939, "Method, Apparatus, and Computer Program Product for Partitioning Prescription Transaction Costs in an Electronic Prescription Transaction", Unpublished (filed Feb. 14, 2025), (Phillip Draa, Inventor), (McKesson Corporation, Assignee).

United States Patent and Trademark Office, Examiner Interview Summary received for U.S. Appl. No. 17/491,870, dated Sep. 23, 2024, 3 pages, US.

United States Patent and Trademark Office, Examiner Interview Summary received for U.S. Appl. No. 16/797,277, dated Aug. 10, 2022, 7 pages, US.

United States Patent and Trademark Office, Final Office Action received for U.S. Appl. No. 17/175,939, dated Feb. 13, 2025, 16 pages, US.

United States Patent and Trademark Office, Final Office Action received for U.S. Appl. No. 17/501,532, dated Feb. 19, 2025, 11 pages, US.

United States Patent and Trademark Office, Final Office Action received for U.S. Appl. No. 18/098,150, dated Feb. 27, 2025, 25 pages, US.

United States Patent and Trademark Office, Final Office Action received for U.S. Appl. No. 17/499,976, dated Mar. 3, 2025, 16 pages, US.

United States Patent and Trademark Office, Final Office Action received for U.S. Appl. No. 16/816,460, dated Mar. 7, 2025, 27 pages, US.

United States Patent and Trademark Office, Final Office Action received for U.S. Appl. No. 16/797,277, dated Sep. 12, 2022, 23 pages, US.

United States Patent and Trademark Office, Final Office Action received for U.S. Appl. No. 17/491,870, dated Jan. 27, 2025, 16 pages, US.

United States Patent and Trademark Office, Non-Final Office Action received for U.S. Appl. No. 17/162,461, dated Feb. 10, 2025, 36 pages, US.

United States Patent and Trademark Office, Non-Final Office Action received for U.S. Appl. No. 16/797,277, dated May 17, 2022, 17 pages, US.

United States Patent and Trademark Office, Non-Final Office Action received for U.S. Appl. No. 17/491,870, dated Jun. 28, 2024, 18 pages, US.

United States Patent and Trademark Office, Notice of Allowance received for U.S. Appl. No. 16/797,277, dated Dec. 21, 2022, 26 pages, US.

United States Patent and Trademark Office, Non-Final Office Action received for U.S. Appl. No. 17/499,976, dated Jul. 2, 2025, 22 pages, US.

(56) References Cited

OTHER PUBLICATIONS

United States Patent and Trademark Office, Final Office Action received for U.S. Appl. No. 17/162,461, dated Aug. 22, 2025, 23 pages.
United States Patent and Trademark Office, Notice of Allowance received for U.S. Appl. No. 17/158,118, dated Aug. 25, 2025, 13 pages.
United States Patent and Trademark Office, Non-Final Office Action received for U.S. Appl. No. 16/816,460, dated Sep. 8, 2025, 31 pages, US.
United States Patent and Trademark Office, Notice of Allowance received for U.S. Appl. No. 17/501,532, dated Sep. 10, 2025, 11 pages, US.
United States Patent and Trademark Office, Ptab Decision on Appeal received for U.S. Appl. No. 16/867,286, dated Sep. 25, 2025, 19 pages, US.
United States Patent and Trademark Office, Notice of Allowance received for U.S. Appl. No. 18/098,150, dated Oct. 8, 2025, 19 pages, US.

* cited by examiner

METHOD, APPARATUS, AND COMPUTER PROGRAM PRODUCT FOR PROVIDING REAL-TIME PRICING INFORMATION

CROSS REFERENCE TO RELATED APPLICATION

This application is a continuation-in-part of and claims priority to U.S. application Ser. No. 16/832,318, filed Mar. 27, 2020, which is a continuation-in-part of and claims priority to U.S. application Ser. No. 16/453,509, filed Jun. 26, 2019, the contents of which are hereby incorporated by reference in their entireties.

This application is also a continuation-in-part of and claims priority to U.S. application Ser. No. 17/499,976, filed Oct. 13, 2021, which is a continuation-in-part of and claims priority to U.S. application Ser. No. 16/453,509, filed Jun. 26, 2019, the contents of which are hereby incorporated by reference in their entireties. This application is also a continuation-in-part of and claims priority to U.S. application Ser. No. 16/698,752, filed Nov. 27, 2019, the contents of which are hereby incorporated by reference in their entireties.

TECHNOLOGICAL FIELD

Embodiments of the present invention relate generally to healthcare transactions and inquiries and, more particularly, to methods, apparatuses, and computer program products for providing real-time pricing information.

BACKGROUND

In the healthcare services industry, patients may appreciate discussing costs of a prescribed medication with their physician or other prescriber during the service and prior to obtaining the prescription at a pharmacy so different medication options may be considered. However, physicians and other prescribers may not always have accurate information available to them during the service regarding costs of the medication. Providing the costs of such prescriptions to prescribers during the service can be a challenge with today's healthcare provider systems as benefit coverage policies and inquiry standards evolve, and discount cash card providers continue to offer competitive pricing and compete for business in the industry. Over time, the financial structures for prescription claims have become more sophisticated (i.e. formulary tiers, deductibles, maximum benefits, etc.), and the availability of discount cash cards more widely available, and prices can vary greatly between pharmacies, and depending on how a prescription inquiry is generated, routed, and/or processed. Patients that are not aware of the cost of their prescribed medication may be less likely to adhere to the prescribed regimen, as they may choose not to purchase the prescription when they visit the pharmacy and learn the cost. Additionally, complexities in benefit plans, pharmacy pricing policies, the numerous cash discount systems and/or the like may make it difficult for a physician to understand the true cost of a prescription to a patient. In some instances, alternative medication may be available that is more cost-efficient for the patient, but the physician or other prescriber may be unaware of the options and/or associated costs.

BRIEF SUMMARY

In some prescriber-facing systems, the prescriber, such as a physician or other healthcare provider, may not have access to information regarding the cost or price of a particular prescription for a patient, or may not have accurate pricing information that utilizes different options for pricing (e.g., with a benefit, cash discount system and/or incentive applied). Some service provider computers that assess different options for pricing prescription drugs (e.g., with a benefit, cash discount system, incentive, and/or the like applied, and/or provide a best pricing option to patients for the prescription at the point of prescription, can require numerous electronic requests to be transmitted to various computing entities in a network. A service provider computer receives prescription inquiries, such as during a patient encounter or visit, and routes requests accordingly, such as to claims processor computers and/or cash discount systems, and monitors for responses to such requests. A service provider computer may further optionally process the responses to determine a best option for the patient, further edit such responses, such as with information indicating which claims processor computer and/or cash discount system can be used to achieve the provided price. Additionally or alternatively, a service provider computer may store and access prior prescription transactions to estimate prices of prescriptions for patients, based on numerous factors. The above described functionality expends processing resources, memory resources, and network resources. In certain scenarios, multiple transactions are routed to different entities. The associated monitoring for responses and further processing thereof require further expenditure of processing resources, memory resource, and network resources.

Methods, apparatuses, and computer program products are therefore provided for supplying a prescriber at the point of prescribing (e.g., during a healthcare service with a patient) with real-time pricing information to provide to a patient. The information may reflect information relating to one or more of a special price for which the medication can be obtained at the patient's preferred pharmacy, cash prices for prescribed drugs at a patient's pharmacy, pricing under a prescription benefit plan, application of a manufacturer-paid incentives or rebates, and/or any combination thereof, and may further include estimates of any of the aforementioned prices, such as in instances of insufficient or absent responses from related systems. According to certain embodiments, the service provider computer can determine a source of a best price for a prescription drug for the patient, and forego or reduce numerous other transactions. At least one goal of example embodiments may include limiting or reducing the above described expenditure of processing resources, memory resources and/or network resources.

An apparatus is provided, comprising one or more processors and at least one memory including computer program code, that when executed by the at least one or more processors, causes the apparatus to store a time threshold, and prescription transactions comprising prior prices paid by patients for medication, and store a special price list comprising one or more special prices for which a medication can be purchased at one or more pharmacies. The computer program code, when executed by the at least one or more processors, further causes the apparatus to receive from a prescriber computer, a prescription inquiry associated with a patient, a pharmacy, and a prescribed medication, and accessing the special price list to determine whether a special price of the prescribed medication is available at the pharmacy.

In an instance the special price of the prescribed medication is available at the pharmacy the computer program code, when executed by the at least one or more processors, further causes the apparatus to determine the special price, accessing the prescription transactions to determine at least one alternative price for which the prescribed medication is available with at least one of one or more benefits, one or more incentives, or a cash discount system applied, and in an instance the special price is less than the at least one alternative price, preventing transmission of the prescription inquiry to at least one of a claims processor computer or a cash discount system, and provide the special price to the prescriber computer.

In an instance at least one of: (a) the special price is not available, or (b) the special price is greater than or equal to the at least one alternative price, the computer program code, when executed by the at least one or more processors, further cause the apparatus to transmit the prescription inquiry to at least one of the claims processor computer or the cash discount system, and monitor for a response thereto. In an instance in which a response is received within the time threshold and the response is sufficient, the computer program code, when executed by the at least one or more processors, further cause the apparatus to transmit the response, comprising a patient pay amount and indicating at least one of the claims processor computer or the cash discount system from which the response was received, to the prescriber computer.

In an instance the response is not received within the time threshold or is insufficient, the computer program code, when executed by the at least one or more processors, further cause the apparatus to determine an estimated cost range for the prescribed medication based on the prescription transactions, and to provide the estimated cost range for the prescribed medication to the prescriber computer.

According to certain embodiments, the special price comprises a pharmacy cash price of a generic version of the prescribed medication. The at least one of the special price, the response comprising the patient pay amount, or the estimated cost range is provided to the prescriber computer in real-time near real-time relative to receiving the prescription inquiry from the prescriber computer.

According to certain embodiments, determining the estimated cost range comprises determining an average value based on a paid amount associated with each of the prescription transactions, identifying a subset of the prescription transactions based on the average value, and from the subset of prescription transactions, determining the estimated cost range of the prescribed medication that ranges a calculated amount from the average value.

In an instance at least one of: (a) the special price is not available, or (b) the special price is greater than or equal to the at least one alternative price, wherein the computer program code, that when executed by the at least one or more processors, further causes the apparatus to identify the claims processor computer or the cash discount system associated with a lower patient cost than a patient cost associated with the other of the claims processor computer or the cash discount system according to the prescription transactions, wherein the prescription inquiry is transmitted to the identified claims processor computer or the identified cash discount system.

The computer program code, that when executed by the at least one or more processors, causes the apparatus to apply a manufacturer paid incentive to a response from at least one of the claims processor computer or cash discount system.

A computer program product is provided, comprising at least one non-transitory computer-readable storage medium having computer-executable program code instructions stored therein, that when executed by one or more processors, cause the one or more processors to store a time threshold, prescription transactions comprising prior prices paid by patients for medication, and a special price list comprising one or more special prices for which a medication can be purchased at one or more pharmacies. The computer-executable program code, when executed by one or more processors, further cause the one or more processors to receive from a prescriber computer, a prescription inquiry associated with a patient, a pharmacy, and a prescribed medication, and access the special price list to determine whether a special price of the prescribed medication is available at the pharmacy.

In an instance the special price of the prescribed medication is available at the pharmacy, the computer-executable program code, when executed by one or more processors, further cause the one or more processors to determine the special price, and access the prescription transactions to determine at least one alternative price for which the prescribed medication is available with at least one of one or more benefits, one or more incentives, or a cash discount system applied. In an instance the special price is less than the at least one alternative price, the computer-executable program code instructions prevent transmission of the prescription inquiry to at least one of a claims processor computer or a cash discount system, and provide the special price to the prescriber computer. In an instance at least one of: (a) the special price is not available, or (b) the special price is greater than or equal to the at least one alternative price, the computer-executable program code, when executed by one or more processors, further cause the one or more processors to transmit the prescription inquiry to at least one of the claims processor computer or the cash discount system, and monitor for a response thereto.

In an instance in which a response is received within the time threshold and the response is sufficient, the computer-executable program code, when executed by one or more processors, further cause the one or more processors to transmit the response, comprising a patient pay amount and indicating at least one of the claims processor computer or the cash discount system from which the response was received, to the prescriber computer. In an instance the response is not received within the time threshold or is insufficient, the computer-executable program code, when executed by one or more processors, further cause the one or more processors to determine an estimated cost range for the prescribed medication based on the prescription transactions, and provide the estimated cost range for the prescribed medication to the prescriber computer.

In an instance at least one of: (a) the special price is not available, or (b) the special price is greater than or equal to the at least one alternative price, the computer-executable program code instructions, when executed by one or more processors, further cause the one or more processors to identify the claims processor computer or the cash discount system associated with a lower patient cost than a patient cost associated with the other of the claims processor computer or the cash discount system according to the prescription transactions, wherein the prescription inquiry is transmitted to the identified claims processor computer or the identified cash discount system. The computer-executable program code instructions, when executed by one or more processors, further cause the one or more processors to apply a manufacturer paid incentive to a response from at least one of the claims processor computer or cash discount system.

A method is provided, such as performed by at least one or more processors, the method comprising storing a time threshold, and prescription transactions comprising prior prices paid by patients for medication, and storing a special price list comprising one or more special prices for which a medication can be purchased at one or more pharmacies. The method further includes receiving from a prescriber computer, a prescription inquiry associated with a patient, a pharmacy, and a prescribed medication, and accessing the special price list to determine whether a special price of the prescribed medication is available at the pharmacy. In an instance the special price of the prescribed medication is available at the pharmacy, the method further includes determining the special price, and accessing the prescription transactions to determine at least one alternative price for which the prescribed medication is available with at least one of one or more benefits, one or more incentives, or a cash discount system applied. The method further includes in an instance the special price is less than the at least one alternative price, preventing transmission of the prescription inquiry to at least one of a claims processor computer or a cash discount system, and providing the special price to the prescriber computer.

In an instance at least one of: (a) the special price is not available, or (b) the special price is greater than or equal to the at least one alternative price, the method includes transmitting the prescription inquiry to at least one of the claims processor computer or the cash discount system, and monitoring for a response thereto. The method further includes, in an instance in which a response is received within the time threshold and the response is sufficient, transmitting the response, comprising a patient pay amount and indicating at least one of the claims processor computer or the cash discount system from which the response was received, to the prescriber computer.

The method further includes in an instance the response is not received within the time threshold or is insufficient, with the one or more processors, determining an estimated cost range for the prescribed medication based on the prescription transactions, and providing the estimated cost range for the prescribed medication to the prescriber computer.

In an instance at least one of: (a) the special price is not available, or (b) the special price is greater than or equal to the at least one alternative price, the method further comprises identifying the claims processor computer or the cash discount system associated with a lower patient cost than a patient cost associated with the other of the claims processor computer or the cash discount system according to the prescription transactions, wherein the prescription inquiry is transmitted to the identified claims processor computer or the identified cash discount system.

The method further includes applying a manufacturer paid incentive to a response from at least one of the claims processor computer or cash discount system.

An apparatus is provided, with means for storing a time threshold, and prescription transactions comprising prior prices paid by patients for medication, and storing a special price list comprising one or more special prices for which a medication can be purchased at one or more pharmacies. The apparatus further includes means for receiving from a prescriber computer, a prescription inquiry associated with a patient, a pharmacy, and a prescribed medication, and accessing the special price list to determine whether a special price of the prescribed medication is available at the pharmacy. In an instance the special price of the prescribed medication is available at the pharmacy, the apparatus further includes means for determining the special price, and means for accessing the prescription transactions to determine at least one alternative price for which the prescribed medication is available with at least one of one or more benefits, one or more incentives, or a cash discount system applied. The apparatus further includes in an instance the special price is less than the at least one alternative price, means for preventing transmission of the prescription inquiry to at least one of a claims processor computer or a cash discount system, and means for providing the special price to the prescriber computer.

In an instance at least one of: (a) the special price is not available, or (b) the special price is greater than or equal to the at least one alternative price, the apparatus includes means for transmitting the prescription inquiry to at least one of the claims processor computer or the cash discount system, and means for monitoring for a response thereto. The apparatus further includes means for, in an instance in which a response is received within the time threshold and the response is sufficient, transmitting the response, comprising a patient pay amount and indicating at least one of the claims processor computer or the cash discount system from which the response was received, to the prescriber computer.

The apparatus further includes means for, in an instance the response is not received within the time threshold or is insufficient, with the one or more processors, determining an estimated cost range for the prescribed medication based on the prescription transactions, and providing the estimated cost range for the prescribed medication to the prescriber computer.

In an instance at least one of: (a) the special price is not available, or (b) the special price is greater than or equal to the at least one alternative price, the apparatus further comprises means for identifying the claims processor computer or the cash discount system associated with a lower patient cost than a patient cost associated with the other of the claims processor computer or the cash discount system according to the prescription transactions, wherein the prescription inquiry is transmitted to the identified claims processor computer or the identified cash discount system. The apparatus further includes means for applying a manufacturer paid incentive to a response from at least one of the claims processor computer or cash discount system.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
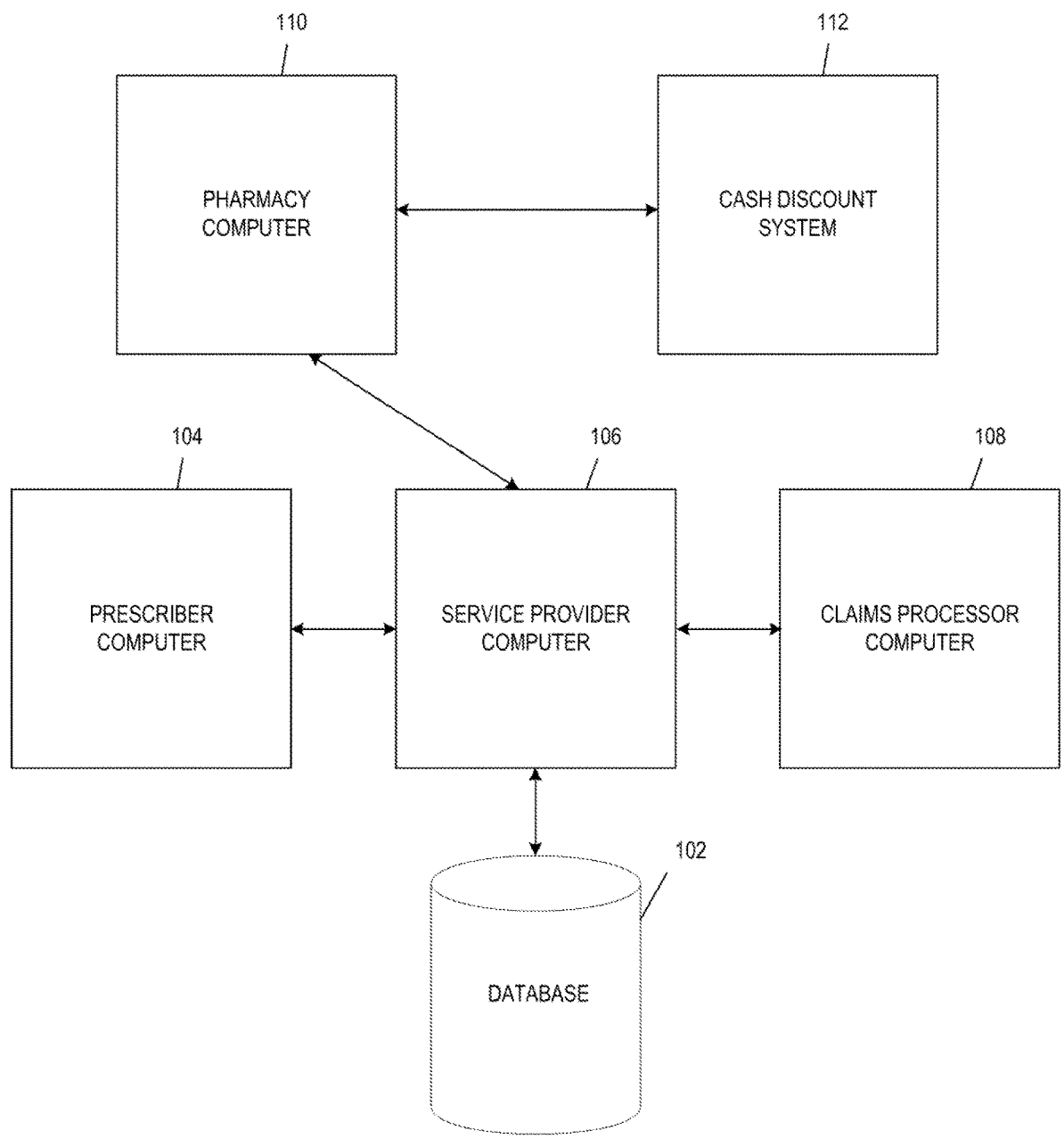
Figure 2:
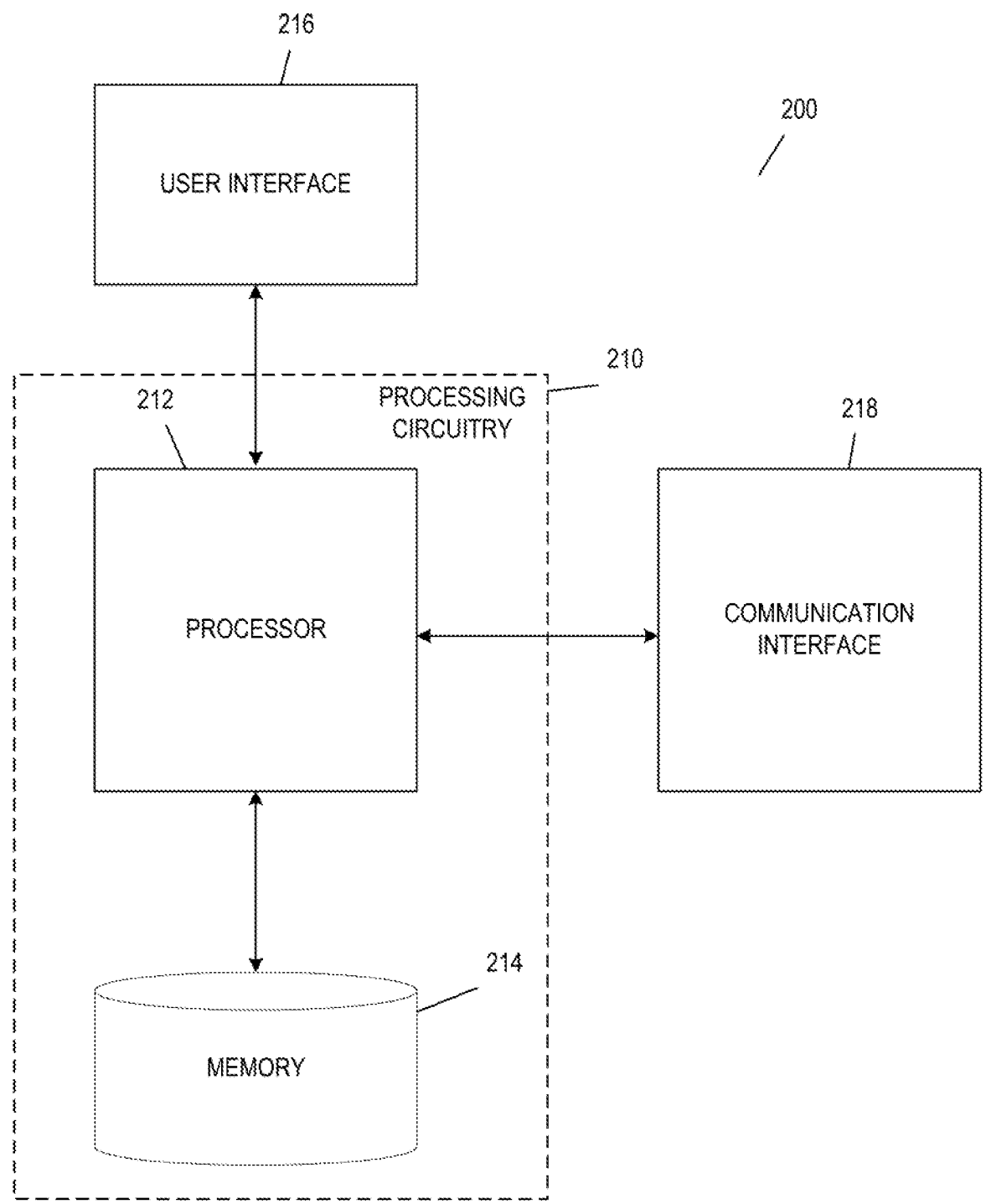
Figure 3:
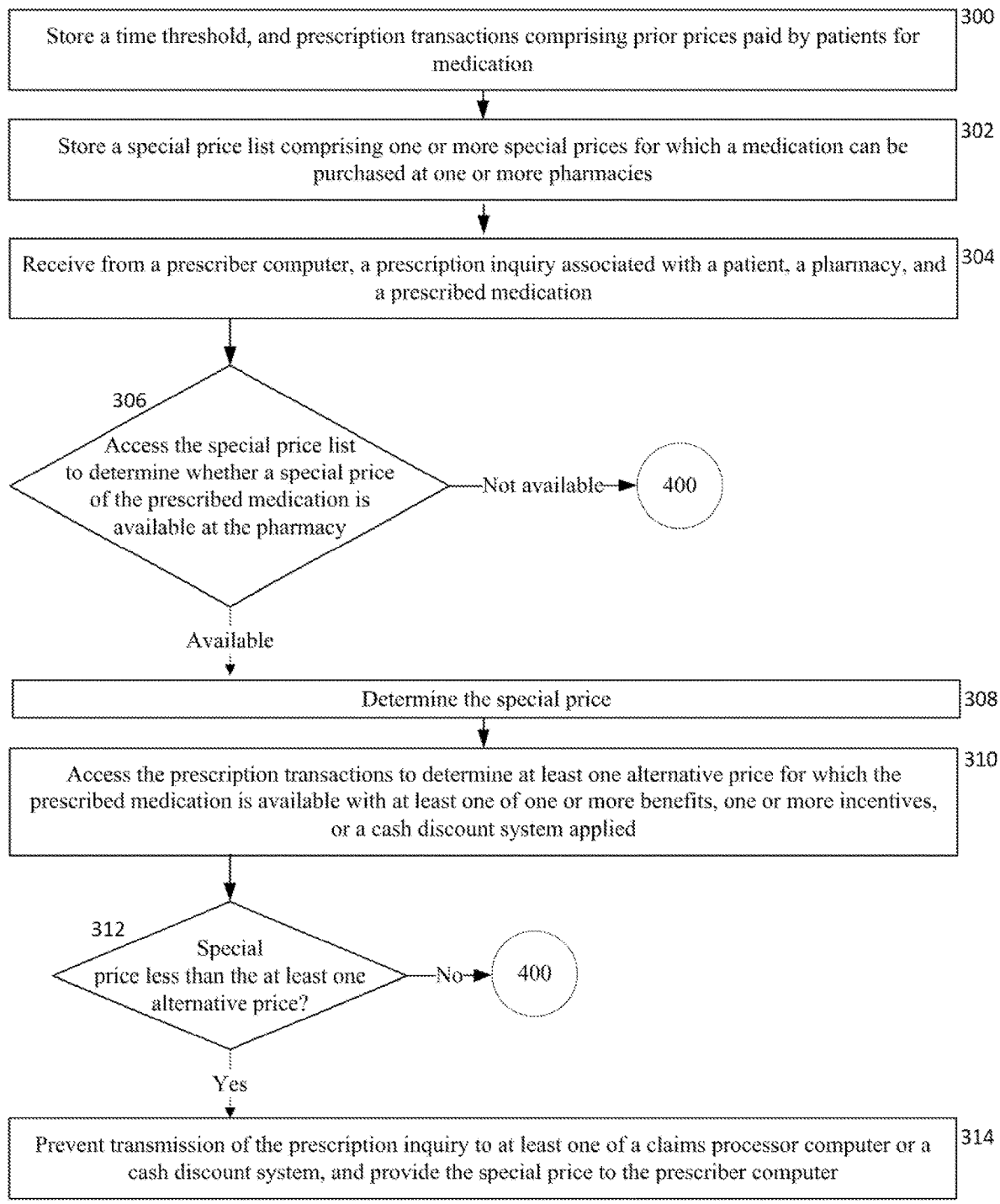
Figure 4:
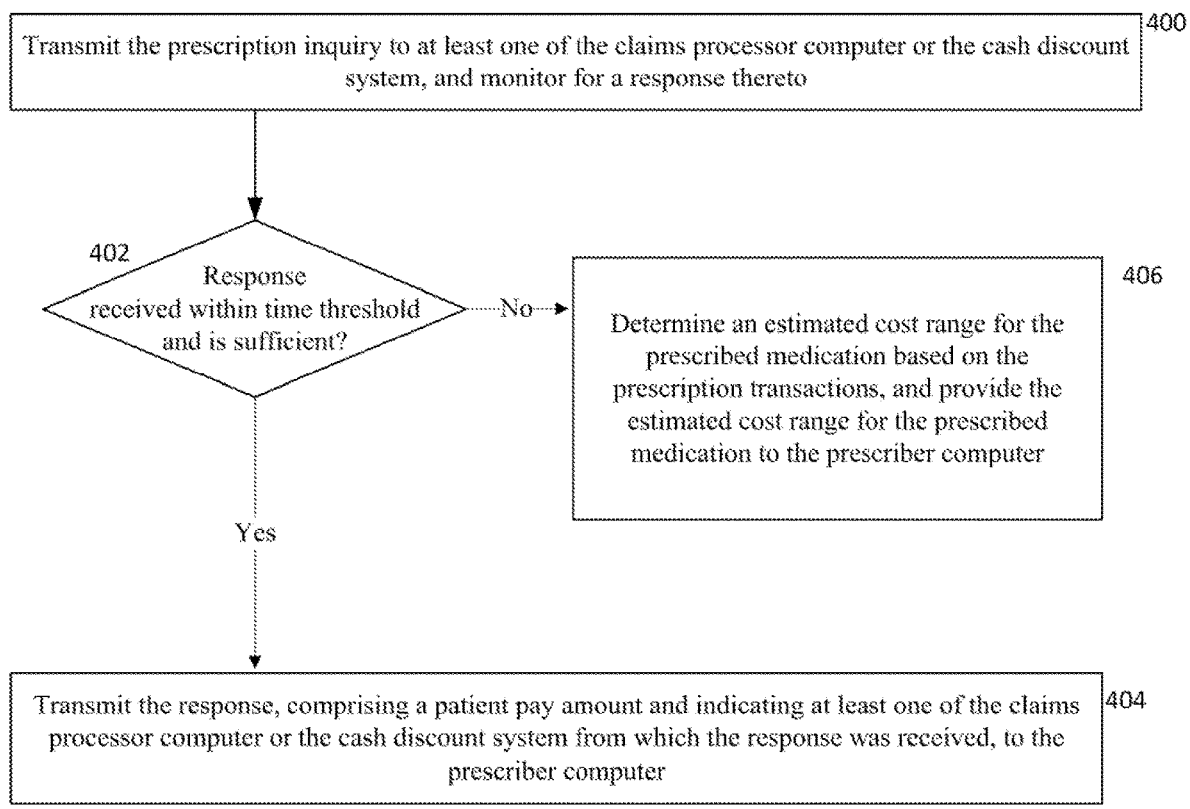

Having thus described embodiments of the invention in general terms, reference will now be made to the accompanying drawings, which are not necessarily drawn to scale, and wherein:

FIG. 1 is an example overview of a system that can be used to practice some example embodiments described herein;

FIG. 2 is an exemplary schematic diagram of an apparatus in accordance with some example embodiments; and FIGS. 3-4 are flowcharts of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to another computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of a system that may implement or include certain example embodiments described herein. The prescriber computer 104 may be associated with a healthcare provider, such as an entity that may prescribe medication and/or treatments, for example, a physician's office, clinic, long-term care facility, hospital, etc. While the exemplary prescriber computer 104 may be frequently referenced herein as part of a physician's office or healthcare network, the prescriber computer 104 may be associated with any other healthcare provider, such as a hospital, urgent care center, dentist, and/or other medical facility or location at which a prescription is written or is otherwise discussed with a patient. Similarly, as commonly described herein as a prescriber or a physician, a user of the prescriber computer 104 pricing information is displayed, may be any clinical staff or end user of a user device in such a healthcare facility or environment.

The prescriber computer 104 may be any processor-driven device that facilitates the recipient or entry of prescription inquiries and/or benefit coverage inquiries made by physicians or clinical staff, and the communication of information associated with such inquiries to the service provider computer 106. The execution of the computer-implemented instructions by the prescriber computer 104 and/or service provider computer 106 may form a special purpose computer or other particular machine that is operable to facilitate the processing of prescription benefit coverage inquiries made by physicians, doctors, clinical staff, pharmacists, and/or the like, and the communication of information associated therewith to a service provider computer and/or claims processor computer 108.

The service provider computer 106 may include, but is not limited to, a processor-driven device that is configured for receiving, processing, and fulfilling inquiries, responses, and/or requests from the prescriber computer 104 and/or the claims processor computer 108 (described below), relating to prescription benefit coverage inquiries, prescription tracking, claims processing, benefits, billing, other healthcare transactions, and/or other related activities. Additionally or alternatively, the service provider computer 106 may be operable to facilitate the receipt, routing, and/or processing of prescription inquiries and/or benefit coverage inquiries and/or associated responses amongst various components and/or subsystems such as, but not limited to, those depicted in FIG. 1.

In certain exemplary embodiments, the service provider computer 106 may be configured as or may comprise a switch or router that evaluates, processes, modifies, reformats, generates, and/or routes benefit coverage inquiries and/or other healthcare transactions. For example, the service provider computer 106 may route prescription inquires and/or benefit coverage inquiries communicated from the prescriber computer 104 to a claims processor computer 108, such as that associated with a pharmacy benefits manager (PBM), an insurer, a Medicare or other government healthcare insurance program payor, or other payor.

Additionally or alternatively, the service provider computer 106 may reformat prescription inquiries and/or benefit coverage inquiries into another form of transaction and modify the recipient information of the reformatted transaction before routing the reformatted transaction to another party, such as a claims processor computer 108. The service provider computer 106 may also direct a prescription inquiry to a claims processor computer 108, which may in turn route a response to the service provider computer 106. The service provider computer 106 may then direct the response to the prescriber computer 104 or other associated entity. For example, a transaction formatted as an electronic health record (EHR) may be transmitted to the prescriber computer 104 using an EHR system, which may be a subsystem of, or a related system to the service provider computer 106.

According to certain embodiments, in addition to or alternatively to forwarding a prescription inquiry to the service provider computer 106, the pharmacy computer 110 may transmit a cash price inquiry to a cash discount system 112. A cash discount system 112 may comprise a computer system that receives, adjudicates, or otherwise processes a cash price inquiry on behalf of the payer associated with a cash discount system. Cash discount systems provide discounted prescription drugs to patients when the patient purchases a prescription at a particular pharmacy with which the cash discount system has an agreement. In some instances, a pharmacy works in agreement with a cash discount system to offer the cash price and/or discount on behalf of the cash discount system. A pharmacy may agree to cooperate with the cash discount system to keep up with competition in a price-competitive market. The pharmacy may receive a dispense fee for dispensing the drug under the cash discount system, such that the pharmacy's revenue for a particular transaction may be the dispense fee, less the cost of ingredients (e.g., the drug), less any applicable administration fees.

In some instances, cash discount systems enable a patient to present a cash discount card and to obtain a medication at a lower cost than what would otherwise be obtainable by submitting a prescription claim to a pharmacy benefits manager (PBM), or other insurance provider, such as one associated with the claims processor computer 108 for the same medication. The increasing number of cash discount systems coming to market, as well as the complex or un-transparent drug pricing under each cash discount system, may make it difficult for the patient to ensure they are obtaining the best price on a prescription drug, and may further make it difficult for a pharmacy to increase or maximize their profits. According to certain embodiments, the pharmacy computer 110 may transmit records of cash transactions to the service provider computer 106.

Accordingly, the service provider computer 106 may be further operable to maintain, access and/or be in communication with one or more suitable data storage devices, such as a database 102, for storing prescription transactions, a time threshold for which responses to prescription inquiries should be monitored by the service provider computer 106, special price lists, and/or other various data. Certain details pertaining to the above mentioned data are described herein.

According to certain embodiments, the database 102 comprises data relating to prescription transactions associated with one or more pharmacy computers 110. Data, such as for example, historical data relating to prescription transactions, prescription claims, and/or cash transactions for prescriptions may be provided by and/or stored in database 102 by a number of entities which may comprise the prescriber computer 104, service provider computer 106, claims processor computer 108, one or more pharmacy computers 110 and/or other related entities. In certain embodiments, data is provided to database 102 by one or more pharmacy computers 110 associated with one or more pharmacies. In this regard, the stored prescription transactions may be referred to herein as historical data and/or historical prescription transactions. These one or more pharmacy computers 110 may voluntarily provide data to database 102 (and/or service provider computer 106, which may in turn store the prescription transactions on database 102), such as data related to prior prescription transactions (including those related to prescription benefits claims, medical benefit claims, and/or cash prescriptions transactions) that have taken place at each respective pharmacy. In this regard, the prescription transactions may comprise paid amounts by consumers (e.g., patients) at particular pharmacies for particular prescriptions, and may reflect cash prices a patient paid for a drug and through which payer, claims processor, cash discount system, and/or like the transaction was routed. The prescription transactions may therefore reflect paid amounts by the consumer given a paid and/or adjudicated prescription claim by the claims processor computer 108. In certain embodiments, the one or more pharmacies may be taking part in a program wherein certain data is supplied to database 102 by the one or more pharmacy computers 110 associated with the one or more pharmacies in an effort to provide patients and prescribers with accurate cost information at a point of prescribing. According to some embodiments, the data may indicate other characteristics about respective prescription transactions, such as the state or other location information of the dispensing pharmacy, the dispense date, information regarding preauthorization requirements, a particular cash discount system that enabled the prescription to be purchased at a cash price, information regarding a prescription benefit claim, a medical benefit claim, an incentive (such as a manufacturer paid incentive), and/or the like. The service provider computer 106 may be configured to mine and store pertinent information from any healthcare transactions and/or claims received and/or generated by the service provider computer 106, particularly data that may utilized by example embodiments described herein to provide information regarding cash prices of prescription drugs, prescription benefits, medical benefits, incentives, and/or estimated cost ranges of prescriptions.

The service provider computer 106 may be further operable to access and/or be in communication with one or more suitable data storage devices, such as a database 102, for storing special price information, such as special price lists or files, and/or other various data. It will be appreciated that special price lists and special price files are provided as non-limiting examples of special price information, and that example embodiments may unitize any format of special price information. In an example embodiment, the database 102 comprises data indicating special prices of prescription drugs provided by one or more pharmacy computers 110. Data, such as for example, special price information, may be provided by and/or stored in database 102 by a number of entities which may comprise the prescriber computer 104, service provider computer 106, claims processor computer 108, one or more pharmacy computers 110 and/or other related entities. In certain embodiments, data is provided to database 102 by one or more pharmacy computers 110 associated with one or more pharmacies. These one or more pharmacy computers 110 may voluntarily provide data to database 102 (and/or service provider computer 106, which may in turn store the special price information on database 102). For example, a pharmacy, such as a national pharmacy chain and/or other pharmacy may enroll in a special price program offered by the service provider, and provide the special price information to the service provider computer 106. The special price data may include prescription or drug identifiers such as a National Drug Code (NDC), a corresponding generic alternative, quantity, and special price associated therewith. According to an example embodiment, the special price may be further associated with a specific state and/or states, and/or the special price information may include an indication that the special price is available for all states, or nationwide. In this regard, the special price information may comprise actual cash prices, such as without any insurance payment or coverage charged by the associated pharmacy for a specific prescription and/or in a specific scenario. The special price information may in certain embodiments reflect discount or loyalty programs offered by the pharmacy. According to certain embodiments, the special price comprises a pharmacy cash price of a generic version of the prescribed medication.

According to certain example embodiments, the one or more pharmacies may be taking part in a program wherein certain data is supplied to database 102 by the one or more pharmacy computers 110 associated with the one or more pharmacies in an effort to provide patients and prescribers with special price offered by the pharmacy, such as a pharmacy cash price, and therefore accurate cost information at a point of prescribing The service provider computer 106 may transmit responses regarding the prescription inquires to the prescriber computer 104. For example, the service provider computer 106 may notify the prescriber computer 104 of and/or provide a response related to a prescription inquiry from the claims processor computer 108, such as the amount the patient should expect to pay for the prescription at a given pharmacy. Example embodiments may transmit responses regarding patient pay amounts provided by a claims processor computer 108 according to a prescription benefit plan, medical benefit plan, and/or predicted cash prices at the pharmacy according to stored prescription transactions, to the prescriber computer 104. The service provider computer 106 may be further configured to provide a targeted out-of-pocket cost based on an incentive from a drug manufacturer. In this regard, a message or other notification may be appended to or included in the response transmitted to the prescriber computer 104.

The example system of FIG. 1 described above is provided merely as an example and it will be appreciated that the example embodiments provided herein may be implemented as or employed by any number of system architectures. Some modifications may be made to certain embodiments. It will be further appreciated that any of the components of FIG. 1 are configured to communicate over a network, or network(s), as described in further detail herein.

Referring now to FIG. 2, apparatus 200 is a computing device(s) configured for implementing a database 102, prescriber computer 104, service provider computer 106, pharmacy computer 110, and/or claims processor computer 108, according to example embodiments.

Apparatus 200 may at least partially or wholly embody any of the database 102, prescriber computer 104, service provider computer 106, claims processor computer 108, pharmacy computer 110, and/or cash discount system 112. Apparatus 200 may therefore implement any of the prescriber computer 104, service provider computer 106, claims processor computer 108, pharmacy computer 110, and/or cash discount system 112, in accordance with some example embodiments, or may be implemented as a distributed system that includes any of the prescriber computer 104, service provider computer 106, claims processor computer 108, pharmacy computer 110, cash discount system 112, and/or associated network(s).

It should be noted that the components, devices, and elements illustrated in and described with respect to FIG. 2 may not be mandatory and thus some may be omitted in certain embodiments. For example, FIG. 2 illustrates a user interface 216, as described in more detail below, which may be optional in any of the prescriber computer 104, service provider computer 106, claims processor computer 108, pharmacy computer 110, and/or cash discount system 112. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210, such as that included in any of the database 102, prescriber computer 104, service provider computer 106, claims processor computer 108, pharmacy computer 110, cash discount system 112, and/or apparatus 200 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as prescriber computer 104, service provider computer 106, pharmacy computer 110, claims processor computer 108, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as service provider computer 106, memory 214 may be configured to store computer program code for performing corresponding functions thereof, as described herein according to example embodiments.

Still further, memory 214 may be configured to store routing tables, which facilitate determining the destination of communications received from a prescriber computer 104, and/or claims processor computer 108. Memory 214 may further include reconciliation tables for tracking the prescription benefit coverage inquiries received from the prescriber computer 104, and reconciling them with responses received from claims processor computer 108. The memory 214 may be modified as described herein, to store reformatted prescription inquiries and/or benefit coverage inquiries with additional information received, determined and/or generated according to example embodiments.

The memory 214 may be further configured to buffer input data for processing by the processor 212. Additionally or alternatively, the memory 214 may be configured to store instructions for execution by the processor 212. In some embodiments, the memory 214 may include one or more databases, such as database 102, that may store a variety of files, contents, or data sets, such as but not limited to prescription transactions, time thresholds for monitoring for responses, special price files, special price information, or special price lists, and/or the like. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. As such, in embodiments in which apparatus 200 implemented as the prescriber computer 104, the user interface 216 may, in some example embodiments, provide means for user entry of insurance information, patient information, details relating to a prescription, and/or the like, and for provision of information relating to a cash price, the estimated cost of a prescription, benefit coverage, and/or the like, as described in further detail below. The user interface 216 may further enable obtaining patient consent for a benefit inquiry to occur according to example embodiments. In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst any of database 102, prescriber computer 104, service provider computer 106, claims processor computer 108, pharmacy computer 110, cash discount system 112, and/or apparatus 200 over a network, and/or to format an electronic healthcare transaction and/or benefit inquiry. Accordingly, the communication interface 218 may, for example, include supporting hardware and/or software for enabling wireless and/or wireline communications via cable, digital subscriber line (DSL), universal serial bus (USB), Ethernet, or other methods.

The network, such as the network in which the system of FIG. 1 or components thereof or components described herein may operate, (e.g., database 102, prescriber computer 104, service provider computer 106, claims processor computer 108, pharmacy computer 110, cash discount system 112, and/or apparatus 200, and/or the like) may include a local area network, the Internet, any other form of a network, or in any combination thereof, including proprietary private and semi-private networks and public networks. The network may comprise a wired network and/or a wireless network (e.g., a cellular network, wireless local area network, wireless wide area network, some combination thereof, and/or the like).

Having now described an example apparatus for implementing example embodiments, FIG. 3 is a flowchart illustrating example operations of an apparatus 200, according to some example embodiments. The operations of FIG. 3 may be performed by apparatus 200, such as with the service provider computer 106 and/or the like.

As shown by operation 300, apparatus 200 may include means, such as processor 212, memory 214, communication interface 218, and/or the like, for storing a time threshold, and prescription transactions comprising prior prices paid by patients for medication. In this regard, apparatus 200 such as the service provider computer 106 may be configured with a time threshold, such as a number of milliseconds or other time measurement, for which apparatus 200 will monitor for responses to requests and before initiating an operation in an instance a response is not received nor is received before time threshold and following transmission of a request. The time threshold may be stored on memory 214, entered and/or modified via user interface 216 and/or communication interface 218, and/or the like. Use of the time threshold is described in further detail herein.

Apparatus 200, such as service provider computer 106, may receive prescription transactions comprising prior prices paid by patients for medication, such as via communication interface 218 and from prescriber computer 104, pharmacy computer 110, claims processor computer 108, cash discount system 112, and/or the like, and store the prescription transactions on database 102. In this regard, the service provider computer 106 functions as a switch for routing numerus prescription transactions from various sources. The prescription transactions may be transmitted from prescriber computers 104, as prescribers obtain pricing information for review under one or more benefit plans, cash discount systems, and/or the like, and the service provider computer 106 obtains and/or estimates pricing information under one or more benefit plans and/or cash systems for provision in real-time or near real-time to the prescriber computer 104 The term "near" real-time is used to express that the inquiry may be processed, and a response provided seemingly instantly, or within a fraction of a second, or seconds, from the time a transaction is submitted or transmitted, to account for computer processing time and/or time for communication within a computer network.

The prescription transactions may additionally or alternatively be received from numerous pharmacy computers 110 as patients obtain medication from a pharmacy, and the transaction is transmitted to the service provider computer 106 for further processing in real-time or near real-time to provide pricing information to the pharmacy computers 110. For example, the service provider computer 106 may route a prescription transaction for adjudication and provide a response to the pharmacy computer 110 in real-time or near real-time for a patient to obtain a prescription at a pharmacy. In this regard, responses may be received by the service provider computer 106 from one or more claims processor computers 108 and/or cash discount systems 112 regarding a patient pay amount for a prescription drug, with an optional benefit or cash discount applied.

The service provider computer 106 may therefore build and maintain the database 102 and/or memory 214 comprising prescription transactions, including at least prices paid or to be paid by patients for prescription drugs, and a prescription drug identifier, such as an NDC. The stored prescription transactions may further include an indicator of the payor, such as one associated with a claims processor computer 108, and/or a cash discount system 112 via which the prescription transaction was processed, and the patient pay amount obtained. The prescription transactions may further include an identifier of a pharmacy and/or pharmacy chain, and/or pharmacy chain and location such as state and/or region. Any other data associated with a prescription transaction may be stored in database 102 and/or memory 214. Additionally or alternatively, certain data may be anonymized. The service provider computer 106 may build and maintain the database 102 to advantageously improve the efficiency of processing additional prescription transactions as described herein. The service provider computer 106 may further utilize the database 102 to provide improved pricing of prescriptions for patients as described herein, therefore improving prescription adherence, reducing prescription abandonment, and improving the overall health of a patient.

As shown by operation 302, apparatus 200 may include means, such as processor 212, memory 214, communication interface 218, and/or the like, for storing a special price list comprising one or more special prices for which a medication can be purchased at one or more pharmacies. The special price information, which may be considered a special price list or special price file, may be received by a service provider computer 106 from a pharmacy computer 110 associated with the pharmacy.

For example, a pharmacy, such as a national pharmacy chain and/or other pharmacy may enroll in a special price program offered by the service provider, and provide the special price information or list with a pharmacy computer 110 to the service provider computer 106. The special price information may include prescription or drug identifiers such as an NDC, an indicator or identifier of an associated generic alternative, quantity, associated state(s), nationwide indicator, and associated special price associated therewith, such as a dollar amount a patient should expect to pay for a prescription associated with the associated entry. The special price may include a price a patient pays without a prescription benefit plan applied, without a claims processor computer 108 processing a prescription claim, and/or without a cash discount system 112 applied.

The special price information may be received by the service provider computer 106 independently of another process. For example, the pharmacy may initiate a transmittal of the special price information to the service provider computer 106 as new or updated special price data becomes available, and/or on a routine or periodic basis as implemented by the pharmacy computer 110 and/or service provider computer 106. As an example, special price information may be provided to the service provider computer 106 by a pharmacy computer 110 on a monthly, quarterly, or annual basis.

As shown by operation 302, apparatus 200 may include means, such as processor 212, memory 214, communication interface 218, and/or the like, for receiving, at a service provider computer 106 and from a prescriber computer 104, a prescription inquiry comprising at least a prescription identifier and a pharmacy indicator.

The prescription inquiry may be generated by a prescriber, such as a physician and/or other clinical staff, at a prescriber computer 104 and may be associated with a particular patient, such as during a patient encounter and/or while the prescriber uses a user interface provided by a prescriber computer 104. In some examples, a physician may consider multiple different prescription options, and discuss the different options with the patient while entering prescription information via a user interface, such as user interface 216. In this regard, the prescription inquiry may include information regarding a medication and/or treatment that the prescriber intends to prescribe to the patient, such as an NDC or other identifier of a prescription drug. The prescription identifier may also indicate a quantity, and/or in an example embodiment, the prescription quantity may be indicated separately from the prescription identifier. The prescriber may also enter or select a preferred pharmacy and/or pharmacies of the patient. The pharmacy indicator included in the prescription inquiry of an example embodiment may therefore indicate a specific pharmacy, an address and/or state of the pharmacy, and/or other relevant pharmacy information. Additionally or alternatively, the pharmacy indicator may include a unique identifier discernable by the prescriber computer 104 and/or service provider computer 106 to retrieve, access and/or provide the aforementioned pharmacy information or details.

In addition to a prescription identifier identifying the potential medication to be prescribed, and/or the pharmacy indicator, the prescription inquiry may also comprise a variety of other information, such as, but not limited to: patient demographic information, such as name, date of birth, age, and/or address, optional insurance/coverage information such as cardholder name, Cardholder ID and/or other identifier, Group ID and/or Group Information, prescriber information such as Primary Care Provider ID or other identifier (e.g. a national provider identifier (NPI) code), Primary Care Provider Name, Prescriber ID or other identifier (e.g. NPI code, DEA number), patient's Preferred Pharmacy or other Healthcare Provider Information (e.g. store name, chain identifier, store address, drug enforcement agency (DEA) number), various claim information such as drug, service, or medication identifier (e.g. via National Drug Code (NDC) number), Prescription/Service Reference Number, Date Prescription Written, Diagnosis/Condition, Number of Refills Authorized, and/or the like.

According to certain embodiments, the service provider computer 106 may receive, transmit, and/or process a plurality of prescription benefit coverage inquiries, such as from one or more prescriber computers 104, on a continual and/or ongoing basis and may process such request in real-time or near real-time. The term "near" real-time is used to express that the inquiry may be processed, and a cost estimate may be desired within a fraction of a second, or seconds, from the time the prescription inquiry is submitted.

In operation 304, apparatus 200 may include means, such as processor 212, memory 214, and/or the like, for receiving from a prescriber computer, a prescription inquiry associated with a patient, a pharmacy, and a prescribed medication. The prescription inquiry may be generated by a prescriber, such as a physician and/or other clinical staff, at a prescriber computer 104 and using a user interface 216, and may be associated with a particular patient, such as a patient being examined by the prescriber during the time when the prescription inquiry is generated and provided by the prescriber computer 104. In some examples, a physician may interact with a user interface 216 to consider multiple different prescription options, and utilize the user interface 216 displayed via the prescriber computer 104, to initiate inquiries toward the service provider computer 106. In this regard, the prescription inquiry may in some embodiments be automatically generated in response to entry of prescription information during a patient encounter and/or appointment with a physician, for example. In certain embodiments, the prescriber may optionally explicitly indicate a request to check pricing information for the prescription, and may optionally enter the patient's preferred pharmacy. Although it is possible for a physician to enter multiple different prescription inquiries during a patient encounter, example embodiments may help reduce the number of prescription inquiries submitted in certain scenarios, or overall throughout the network, by assessing various sources of pricing information in response to each prescription inquiry, and efficiently providing the best or multiple pricing options (e.g., such as a special price, via a claims processor computer 108, cash discount system 112, incentive, and/or the like) as described herein.

The prescription inquiry may include information regarding a medication and/or treatment that the prescriber intends to prescribe or is prescribing to the patient. The prescription inquiry may also comprise a variety of information, such as, but not limited to: patient demographic information, such as name, date of birth, age, and/or address, insurance/coverage information such as cardholder name, Cardholder ID and/or other identifier, Group ID and/or Group Information, prescriber information such as Primary Care Provider ID or other identifier (e.g. NPI code), Primary Care Provider Name, Prescriber ID or other identifier (e.g. NPI code, DEA number), patient's Preferred Pharmacy or other Healthcare Provider Information (e.g. store name, chain identifier, store address, etc.), various claim information such as prescribed medication and/or drug, service, or product information (e.g. via National Drug Code (NDC) number), Prescription/Service Reference Number, Date Prescription Written, Diagnosis/Condition, Number of Refills Authorized, and/or the like.

In operation 306, apparatus 200 may include means, such as processor 212, memory 214, communication interface 218, and/or the like, for, accessing the special price list to determine whether a special price of the prescribed medication is available at the pharmacy. According to certain embodiments, in response to receiving the prescription inquiry, the service provider computer 106 determines whether special price information is available that is associated with the pharmacy indicator and prescription drug indicated in the prescription inquiry received in operation 304. In this regard, the apparatus of an example embodiment, such as the service provider computer 106, may parse or process the prescription inquiry to obtain the pharmacy indicator and/or identifier of the prescription drug such as an NDC (indicated in the prescription inquiry received in operation 304, or an NDC of a generic equivalent), and access database 102 and/or memory 214 to determine availability of corresponding special price information, such as special price information having a matching pharmacy indicator and prescription drug identifier. In certain embodiments, the service provider computer 106 may optionally store a list of pharmacy indicators for which special price information has previously been received and/or stored, and/or a list of pharmacy indicators indicating pharmacies that have enrolled in the special pricing program with the service provider. Additionally or alternatively, the service provider computer 106, such as with processor 212, may attempt to access special price information associated with or identified by the pharmacy indicator and/or prescription drug identifier and/or generic equivalent thereof. If there is no special price information available for the pharmacy indicated by the pharmacy indicator, processing may continue to operation 400 of FIG. 4, described in further detail below.

In an instance the special price of the prescribed medication is available at the pharmacy, at operation 308, apparatus 200 may include means, such as processor 212, memory 214, communication interface 218, and/or the like, for determining the special price, such as from database 102 and/or memory 214. The service provider computer 106 may access the special price information to determine the special price for the prescription drug at the pharmacy indicated in the prescription inquiry received in operation 304.

In operation 310, apparatus 200 may include means, such as processor 212, memory 214, communication interface 218, and/or the like, for accessing the prescription transactions to determine at least one alternative price for which the prescribed medication is available with at least one of one or more benefits, one or more incentives, or a cash discount system applied. The service provider computer 106 may access the prescription transactions, such as prior transactions, on database 102 and/or memory 214 to determine at least one alternative price, such as a price indicated in another prescription transaction under a same prescription benefit plan, for the same prescription drug at the same pharmacy and/or pharmacy chain. As another the example, the at least one alternative price may include a cash price for which the drug was obtained at the pharmacy and/or pharmacy chain via a cash discount system 112.

According to certain embodiments, the at least one alternative price may be determined as a lowest patient pay amount and/or best ranked price(s) and may reflect any of a cash price and/or copay or patient pay amount under a prescription benefit plan, and optionally with an incentive applied.

In certain embodiments, more recent prescription transactions for the prescription drug at the pharmacy, or within the pharmacy chain and optionally restricted to those within a specific locale, state, and/or other geographic jurisdiction, may be accessed to determine the at least one alternative price. In certain embodiments, prescription transactions accessed to determine the at least one alternative price may be limited to a predetermined duration prior to the operation, for example, 30 days.

According to certain embodiments, an incentive amount may be accessed from database 102, in incentive data, and/or from the stored prescription transactions to which incentives were applied. Incentives may be estimated and/or calculated by example embodiments, such as the service provider computer 106 and processor 212 in a variety of ways. Additional information relating to incentives applied to prescription transactions is provided in U.S. Pat. No. 10,489,552, "SYSTEMS AND METHODS FOR DETERMINING AND COMMUNICATING PATIENT INCENTIVE INFORMATION TO A PRESCRIBER," and U.S. application Ser. No. 16/832,318, "Method, Apparatus, And Computer Program Product For Estimated Prescription Costs," the entire contents of which are hereby incorporated by reference in their entireties.

Pricing options may be ranked in a variety of ways. According to certain embodiments, the at least one alternative price may be identified as the lowest price, taking into consideration cash discount systems 112, a prescription benefit plan and associated claims processor computer 108 and/or an incentive. In certain embodiments, multiple alternative prices may be determined from the stored prescription transactions and from various sources. According to certain embodiments, if a price for which a prescription can be obtained under a prescription benefit plan matches a price for which a prescription can be obtained via a cash discount system 112, the price under the prescription benefit plan may be ranked better than the cash price, as a prescription transaction obtained via the prescription benefit plan may count towards a plan deductible.

Additionally or alternatively, pharmacy revenue may impact how a price is ranked. As described above, a pharmacy often pays an administrative fee to a cash discount system 112, such that selling some particular drugs in accordance with a cash discount system 112 may decrease pharmacy revenue per transaction, relative to selling the same drug under the patient's pharmacy benefit plan. In this regard, different cash discount systems may be scored and/or ranked for a particular prescription medication and pharmacy. For example, the cash discount system that produces the greatest total savings for the pharmacy plus total savings for the patient may be scored and/or ranked as the best cash discount system for the transaction. In this regard, determining the at least one alternative price and/or best ranked cash price(s) for the prescribed medication at the pharmacy comprises assessing pharmacy revenue and an amount to be paid by the patient, such as an out of pocket cost. In some embodiments, multiple cash prices may be considered for further processing. As yet another example, pharmacy revenue may not be considered, and rather the cash prices, and/or best ranked cash price(s) may be determined as a lowest or the lowest cash price(s) for the patient. Additionally or alternatively, certain example embodiments may advantageously consider pharmacy revenue to identify the at least one cash price, or the best ranked cash price(s) as a cash price(s) that results in pharmacy revenue that equals or is greater than pharmacy revenue for a prescription claim for the same drug submitted to a benefit plan, that also reduces or matches the out of pocket cost for the patient in comparison to an out of pocket cost (e.g., co-pay) under the benefit plan.

As shown by 312 and operation 314, in an instance the special price is less than the at least one alternative price, apparatus 200 may include means, such as processor 212, memory 214, communication interface 218, and/or the like, for preventing transmission of the prescription inquiry to at least one of a claims processor computer or a cash discount system, and providing the special price to the prescriber computer. In this regard, example embodiments improve efficiency of a service provider computer 106 by forgoing execution of the operations of FIG. 4, in certain scenarios, such as when the special price is less than the at least one alternative price. The prevention of transmission of the prescription inquiry to at least one of a claims processor computer or a cash discount system conserves processing, memory and network resources otherwise expended to facilitate the further processing and related communications described below with respect to FIG. 4. The service provider computer 106 may proceed to provide a response message to the prescriber computer 104, and cause display of the message via a user interface, such as user interface 216, indicating the special price for the prescription drug, and an optional message indicating that the special price may be a better option than a cash price under a cash discount system and/or a patient pay amount under a prescription benefit plan. In this regard, in addition to the improved efficiencies of the related systems, the prescriber and patient can discuss the pricing option, and make an educated decision. The patient is therefore informed of the price, including the special price, the patient should expect to pay, thereby improving prescription adherence, reducing prescription abandonment, and the overall health of the patient. In certain scenarios, the patient and prescriber may discuss that the prescription is too expensive, and the prescriber could explore alternative options, such that certain operations discussed herein may be repeated for a different prescription drug.

As further shown at operation 312, in an instance the special price is not less that the at least one alternative price, processing continues at operation 400 of FIG. 4. FIG. 4 is a flowchart of operations that may be performed by apparatus 200, such as service provided computer 106, in an instance at least one of: (a) the special price is not available, or (b) the special price is greater than or equal to the at least one alternative price.

As shown by operation 400, apparatus 200 may include means, such as processor 212, memory 214, communication interface 218, and/or the like, for transmitting the prescription inquiry to at least one of the claims processor computer or the cash discount system, and monitoring for a response thereto. The service provider computer 108 may perform pre-edits and route the prescription inquiry to any of the claims processor computer 108, an/or cash discount system 112 indicated in the prescription inquiry.

In certain embodiments, the claims processor computer 108 may adjudicate or otherwise process the prescription inquiry. For example, the claims processor computer 108 may be associated with the patient's PBM, insurance provider, and/or the like. In some embodiments, the adjudication may comprise a determination of whether the medication associated with the prescription inquiry is covered by the patient's insurance and may provide additional medication cost information relevant to the patient and/or prescriber. According to certain embodiments, the prescription inquiry is transmitted to a cash discount system 112.

According to certain embodiments, the service provider computer 106 may identify the claims processor computer or the cash discount system associated with a lower patient cost than a patient cost associated with the other of the claims processor computer 108 and/or the cash discount system 112 according to the prescription transactions, and the prescription inquiry is transmitted to the identified claims processor computer 108 or the identified cash discount system.

At operation 402, apparatus 200 may include means, such as processor 212, memory 214, communication interface 218, and/or the like, for determining whether a response is received within the time threshold. For example, the service provider computer 106 may await a response from the claims processor computer 108 and/or cash discount system 212 by monitoring or tracking the time it takes to receive a response and/or how much time has elapsed since transmitting the request from the service provider computer 106. In this regard, a predetermined amount of time used as a time threshold may be considered a predefined condition. It should be appreciated, however, that the predetermined amount of time and/or any other predefined condition (described below) may be configurable, such as by a user with administrative rights and/or the like. If a response is determined to have been received by the service provider computer 104 within the time threshold, processing continues to operation 404.

At operation 404, apparatus 200 may include means, such as processor 212, memory 214, communication interface 218, and/or the like, for transmitting the response, comprising a patient pay amount and indicating at least one of the claims processor computer 108 and/or the cash discount system 112 from which the response was received, to the prescriber computer 104. According to certain embodiments, the service provider computer 106 may further apply a manufacturer paid incentive to a response from at least one of the claims processor computer 108 and/or cash discount system 112. The patent pay amount and indication of at least one of the claims processor computer 108 and/or the cash discount system 112 from which the response was received, and/or an optional incentive may be displayed via user interface 216, so that pricing options can be discussed and/or considered similarly as in operation 314. Example embodiments therefore advantageously route the prescription inquiries to a claims processor computer 108 and/or cash discount system 112 to determine a price of the prescription drug, and do so only if the special price is not available or does not provide a better price for the patient than what is determined as a likely price according to stored prescription transactions. The efficiency of the service provider computer 106 is therefore improved by reducing the transactions routed from the service provider computer 106 and reducing the associated monitoring for responses, and while improving the accuracy of the pricing information.

If it is determined a response has not have been received by the service provider computer 106 within the time threshold, and/or the response is insufficient, processing may proceed to operation 406. In some examples, the response time may be too slow, and/or no response is received at all relating to the prescription inquiry. A response may not be received for any number of reasons, such as, for example, one or more errors on behalf of the claims processor computer 108, one or more errors associated with the prescription inquiry, and/or the like. In certain embodiments, a response may be received but is insufficient for providing pricing information due to one or more errors, null values, and/or missing pricing information. More details regarding the contents of a response and determining whether the response is sufficient is described in U.S. application Ser. No. 16/832,318, "Method, Apparatus, And Computer Program Product For Estimated Prescription Costs," the entire contents of which is hereby incorporated by reference.

In this regard, in operation 406, performed when a sufficient response is not received within the time threshold, apparatus 200 may include means, such as processor 212, memory 214, and/or the like, for determining an estimated cost range for the prescribed medication based on the prescription transactions, and provide the estimated cost range for the prescribed medication to the prescriber computer 104. In this regard, in an instance in which a response from the pharmacy claims processor computer 108 is not received or a received response fails to satisfy a predefined condition, a cost range for the prescribed medication may be estimated as described in further detail in U.S. application Ser. No. 16/832,318, such as by filtering stored prescription transactions, calculating average amounts paid for a same prescription at the pharmacy and/or pharmacy chain, calculating a standard deviation, and determining an estimated price range. Determining the estimated cost range may therefore include determining an average value based on a paid amount associated with each of the prescription transactions, identifying a subset of the prescription transactions based on the average value, and, from the subset of prescription transactions, determining the estimated cost range of the prescribed medication that ranges a calculated amount from the average value As described herein, numerous variations and/or sources of pricing information may be returned to the prescriber computer 104. The special price, a response (such as from a claims processor computer 108 and/or cash discount system 112 comprising the patient pay amount), and/or the estimated cost range is provided to the prescriber computer in real-time near real-time relative to receiving the prescription inquiry from the prescriber computer. The service provider computer 106 may cause any of the pricing information and/or associated messages, to be displayed via a user interface 216 of the prescriber computer 104, such as with communication interface 218, processor 212, memory 214, and/or the like.

Example embodiments, such as those including but not limited to those performing operations described above, may therefore provide technical improvements over other service provider systems. As described herein, providing pricing information to the prescriber computer 104 in real-time or near real-time can require or involve numerous transactions to be routed to various entities, requiring further response monitoring, processing, estimating, and/or the like. Example embodiments improve upon such systems by advantageously reducing the routing of such transactions and corresponding processing in certain scenarios. The solutions provided by example embodiments therefore improve the efficiency of the service provider computer 106.

Similarly, example embodiments may reduce and/or eliminate the need for prescription inquiry resubmissions, and/or the like, caused by users such as prescribers entering different benefit information, claims processor computer 108 and/or cash discount system 112 in an effort to find a better price for the patient.

This may therefore reduce the resources expended, such as memory and/or processing power, that may otherwise be required to facilitate the resubmission (and possibly numerous resubmissions) of prescription inquiries, as well as the associated rerouting, and reprocessing of the resubmitted transaction(s) throughout the various components described herein. Likewise, example embodiments may reduce processing resources otherwise expensed on extensive research, custom queries, and/or the like.

Still further, example embodiments reduce the needs for user to submit separate inquiries regarding incentives, or targeted out-of-pocket costs, thereby further reducing the resources expended, such as memory and/or processing power, that may otherwise be required to facilitate such requests. Accordingly, example embodiments described herein further improve the technical efficiency of systems implementing and/or employing such embodiments.

Additionally or alternatively, prescription adherence may be improved, abandonment reduced, and the health of patients improved by providing accurate and real-time or near real-time pricing information during an appointment and while the prescriber can discuss options.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIGS. 3-4 illustrate operations of a method, apparatus, and computer program product according to some example embodiments. It will be understood that each operation of the flowchart or diagrams, and combinations of operations in the flowchart or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising one or more processors and at least one memory including computer program code, that when executed by the one or more processors, causes the one or more processors to perform steps of:
   storing a time threshold, and prescription transactions comprising prior prices paid by patients for medication;
   storing a special price list comprising one or more special prices for which a medication can be purchased at one or more pharmacies;
   receiving from a prescriber computer, a prescription inquiry comprising a routing indication, a patient, a pharmacy, and a prescribed medication;
       accessing the prescription transactions and determining at least one alternative price for which the prescribed medication is available with at least one of one or more benefits, one or more incentives, or cash discounts;
       accessing the special price list and determining based on the prescription inquiry whether a special price is available;
       if a special price is available:
           in an instance the special price is less than the at least one alternative price, transmitting the special price to the prescriber computer;
       if: (a) the special price is not available, or (b) the special price is greater than or equal to the at least one alternative price:
       transmitting, based on the routing indication, the prescription inquiry to either at least one of a claims processor computer or a cash discount system;
       in an instance in which a response to the transmitted prescription inquiry is received from the claims processor computer or the cash discount system within the time threshold and the response comprises a patient pay amount, transmitting the response, comprising the patient pay amount and an indication of at least one of the claims processor computer or the cash discount system from which the response was received, to the prescriber computer; and
   in an instance a response to the transmitted prescription inquiry is not received from the claims processor computer or the cash discount system within the time threshold or the response received within the time threshold lacks the patient pay amount, determining an estimated cost range for the prescribed medication based on the prescription transactions, and transmitting the estimated cost range for the prescribed medication to the prescriber computer.

2. The apparatus according to claim 1, wherein the special price comprises a pharmacy cash price of a generic version of the prescribed medication.

3. The apparatus according to claim 1, wherein the computer program code, that when executed by the one or more processors, further causes the one or more processors to perform a step of:
   providing to the prescriber computer in real-time or near real-time relative to receiving the prescription inquiry from the prescriber computer, at least one of: (a) the special price, (b) the response comprising the patient pay amount, or (c) the estimated cost range.

4. The apparatus according to claim 1, wherein determining the estimated cost range comprises:
   determining an average value based on a paid amount associated with each of the prescription transactions;
   identifying a subset of the prescription transactions based on the average value; and
   from the subset of prescription transactions, determining the estimated cost range of the prescribed medication based on the average value.

5. The apparatus according to claim 1, wherein the computer program code, that when executed by the one or more processors, further causes the one or more processors to perform steps of:
   in an instance at least one of: (a) the special price is not available, or (b) the special price is greater than or equal to the at least one alternative price:
   identifying the claims processor computer or the cash discount system associated with a lower patient cost than a patient cost associated with the other of the identified claims processor computer or the cash discount system according to the prescription transactions; and
   transmitting the prescription inquiry to the identified claims processor computer or the identified cash discount system.

6. The apparatus according to claim 1, wherein the computer program code, that when executed by the at least one or more processors, causes the one or more processors to perform a step of:

applying a manufacturer paid incentive to a response from at least one of the claims processor computer or cash discount system.

7. A computer program product comprising at least one non-transitory computer-readable storage medium having computer-executable program code instructions stored therein, that when executed by one or more processors, cause the one or more processors to perform steps of:

storing a time threshold, and prescription transactions comprising prior prices paid by patients for medication;

storing a special price list comprising one or more special prices for which a medication can be purchased at one or more pharmacies;

receiving from a prescriber computer, a prescription inquiry comprising a routing indication, a patient, a pharmacy, and a prescribed medication;

accessing the prescription transactions and determining at least one alternative price for which the prescribed medication is available with at least one of one or more benefits, one or more incentives, or cash discounts;

accessing the special price list and determining based on the prescription inquiry whether a special price is available;

if a special price is available:
in an instance the special price is less than the at least one alternative price, transmitting the special price to the prescriber computer;

if: (a) the special price is not available, or (b) the special price is greater than or equal to the at least one alternative price:

transmitting, based on the routing indication, the prescription inquiry to either at least one of a claims processor computer or a cash discount system;

in an instance in which a response to the transmitted prescription inquiry is received from the claims processor computer or the cash discount system within the time threshold and the response comprises a patient pay amount, transmitting the response, comprising the patient pay amount and an indication of at least one of the claims processor computer or the cash discount system from which the response was received, to the prescriber computer; and in an instance a response to the transmitted prescription inquiry is not received from the claims processor computer or the cash discount system within the time threshold or the response received within the time threshold lacks the patient pay amount, determining an estimated cost range for the prescribed medication based on the prescription transactions, and transmitting the estimated cost range for the prescribed medication to the prescriber computer.

8. The computer program product according to claim 7, wherein the special price comprises a pharmacy cash price of a generic version of the prescribed medication.

9. The computer program product according to claim 7, wherein the computer-executable program code instructions, when executed by the one or more processors, further cause the one or more processors to perform a step of:

providing to the prescriber computer in real-time or near real-time relative to receiving the prescription inquiry from the prescriber computer, at least one (a) of the special price, (b) the response comprising the patient pay amount, or (c) the estimated cost range.

10. The computer program product according to claim 7, wherein determining the estimated cost range comprises:

determining an average value based on a paid amount associated with each of the prescription transactions;

identifying a subset of the prescription transactions based on the average value; and from the subset of prescription transactions, determining the estimated cost range of the prescribed medication based on the average value.

11. The computer program product according to claim 7, wherein the computer-executable program code instructions, when executed by the one or more processors, further cause the one or more processors to perform steps of:

in an instance at least one of: (a) the special price is not available, or (b) the special price is greater than or equal to the at least one alternative price:

identifying the claims processor computer or the cash discount system associated with a lower patient cost than a patient cost associated with the other of the identified claims processor computer or the cash discount system according to the prescription transactions; and transmitting the prescription inquiry to the identified claims processor computer or the identified cash discount system.

12. The computer program product according to claim 7, wherein the computer-executable program code instructions, when executed by the one or more processors, further cause the one or more processors to perform a step of:

applying a manufacturer paid incentive to a response from at least one of the claims processor computer or cash discount system.

\* \* \* \* \*